US011700531B2

(12) United States Patent
Piirilä et al.

(10) Patent No.: US 11,700,531 B2
(45) Date of Patent: *Jul. 11, 2023

(54) SYSTEM AND METHOD FOR PHASE MANIPULATION ATTACK PROTECTION AND DETECTION IN AOA AND AOD

(71) Applicant: Silicon Laboratories Inc., Austin, TX (US)

(72) Inventors: Esa Piirilä, Helsinki (FI); Lauri Hintsala, Jokikunta (FI)

(73) Assignee: Silicon Laboratories Inc., Austin, TX (US)

( * ) Notice: Subject to any disclaimer, the term of this patent is extended or adjusted under 35 U.S.C. 154(b) by 395 days.

This patent is subject to a terminal disclaimer.

(21) Appl. No.: 17/094,081

(22) Filed: Nov. 10, 2020

(65) Prior Publication Data

US 2022/0150705 A1 May 12, 2022

(51) Int. Cl.
*H04W 12/122* (2021.01)
*H04W 4/029* (2018.01)
(Continued)

(52) U.S. Cl.
CPC ............ *H04W 12/122* (2021.01); *G01S 3/48* (2013.01); *H01Q 3/36* (2013.01); *H04W 4/029* (2018.02)

(58) Field of Classification Search
CPC ... H04W 12/0433; H04L 9/088; H04L 9/0631
See application file for complete search history.

(56) References Cited

U.S. PATENT DOCUMENTS

| 7,804,445 B1 * | 9/2010 | Fiore .................. G01S 3/74 342/146 |
| 11,019,505 B1 * | 5/2021 | Files ..................... H04W 4/023 |

(Continued)

OTHER PUBLICATIONS

Cominelli et al., "Dead on Arrival: An Empirical Study of The Bluetooth 5.1 Positioning System", 13th International Workshop on Wireless Network Testbeds, Experimental evaluation & Characterization (WiNTECH'19): Oct. 25, 2019.

(Continued)

*Primary Examiner* — Viral S Lakhia
(74) *Attorney, Agent, or Firm* — Nields, Lemack & Frame, LLC

(57) ABSTRACT

Systems and methods for detecting and protecting against phase manipulation during AoA or AoD operations are disclosed. For AoA operations, the network device receiving the constant tone extension (CTE) generates an antenna switching pattern, which may be randomly generated. The network device then receives the CTE using a plurality of antenna elements. In one embodiment, the network device compares the phase of portions of the CTE signal received that utilize the same antenna element. If the phase of these portions differs by more than a threshold, the network device detects a malicious attack and acts accordingly. In another embodiment, if the AoA algorithm cannot determine the angle of arrival, the network device detects a malicious attack and acts accordingly. For angle of departure operations, the network device that transmits the CTE signal generates the antenna switching pattern and transmits it to the position engine, which performs the comparisons described above.

21 Claims, 16 Drawing Sheets

(51) Int. Cl.
  *G01S 3/48* (2006.01)
  *H01Q 3/36* (2006.01)

(56) References Cited

U.S. PATENT DOCUMENTS

| | | | |
|---|---|---|---|
| 11,122,389 B2* | 9/2021 | Smith | H04W 76/15 |
| 11,269,044 B2* | 3/2022 | Stitt | G01S 3/043 |
| 11,438,089 B2 | 9/2022 | Piiriläet al. | |
| 11,540,135 B2* | 12/2022 | Bhanage | H04W 12/122 |
| 11,545,766 B2* | 1/2023 | Nagata | H01R 9/24 |
| 11,546,766 B2* | 1/2023 | Kuchler | G01S 7/415 |
| 2008/0291985 A1 | 11/2008 | Adnani et al. | |
| 2019/0229820 A1* | 7/2019 | Scaglione | H04B 17/23 |
| 2020/0178054 A1* | 6/2020 | Simileysky | H04B 17/336 |
| 2020/0264256 A1* | 8/2020 | Stitt | G01S 3/04 |
| 2021/0058936 A1* | 2/2021 | Gordaychik | H04W 72/23 |
| 2022/0149977 A1 | 5/2022 | Piiriläet al. | |
| 2022/0337335 A1 | 10/2022 | Piiriläet al. | |
| 2022/0417743 A1* | 12/2022 | Lee | H04L 9/001 |
| 2022/0417753 A1* | 12/2022 | Cho | H04W 74/0833 |

OTHER PUBLICATIONS

Office action dated Jan. 20, 2022 in co-pending U.S. Appl. No. 17/094,079.
Office action dated Jun. 22, 2022 in co-pending U.S. Appl. No. 17/094,079.
Office action dated Jul. 13, 2022 in co-pending U.S. Appl. No. 17/094,079.
Office action dated Feb. 15, 2023 in co-pending U.S. Appl. No. 17/847,358.

* cited by examiner

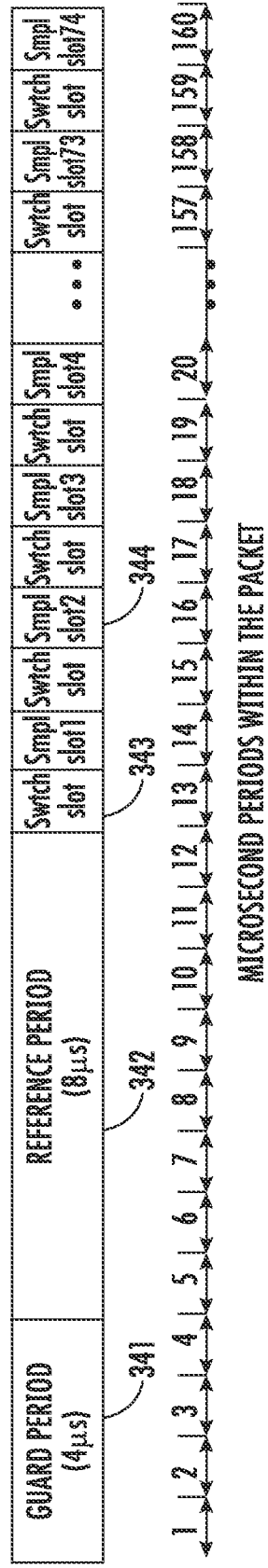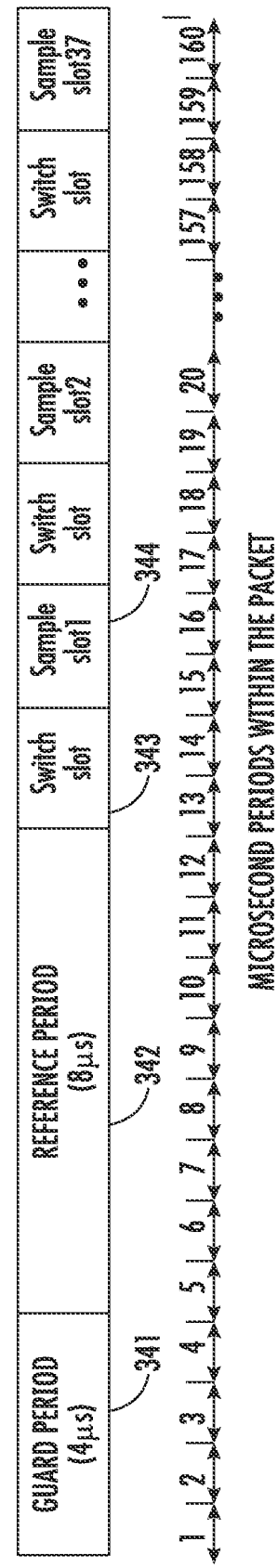

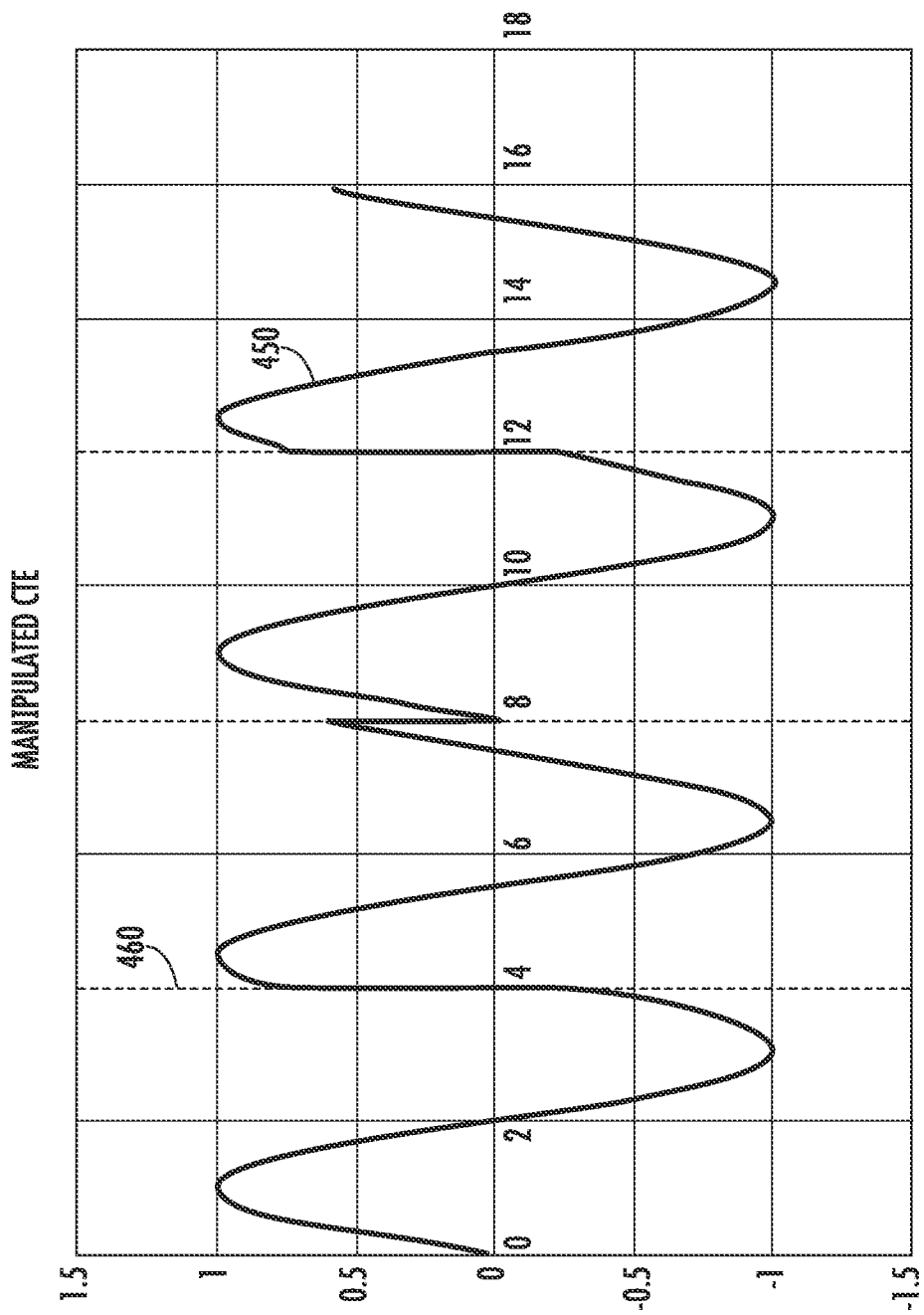

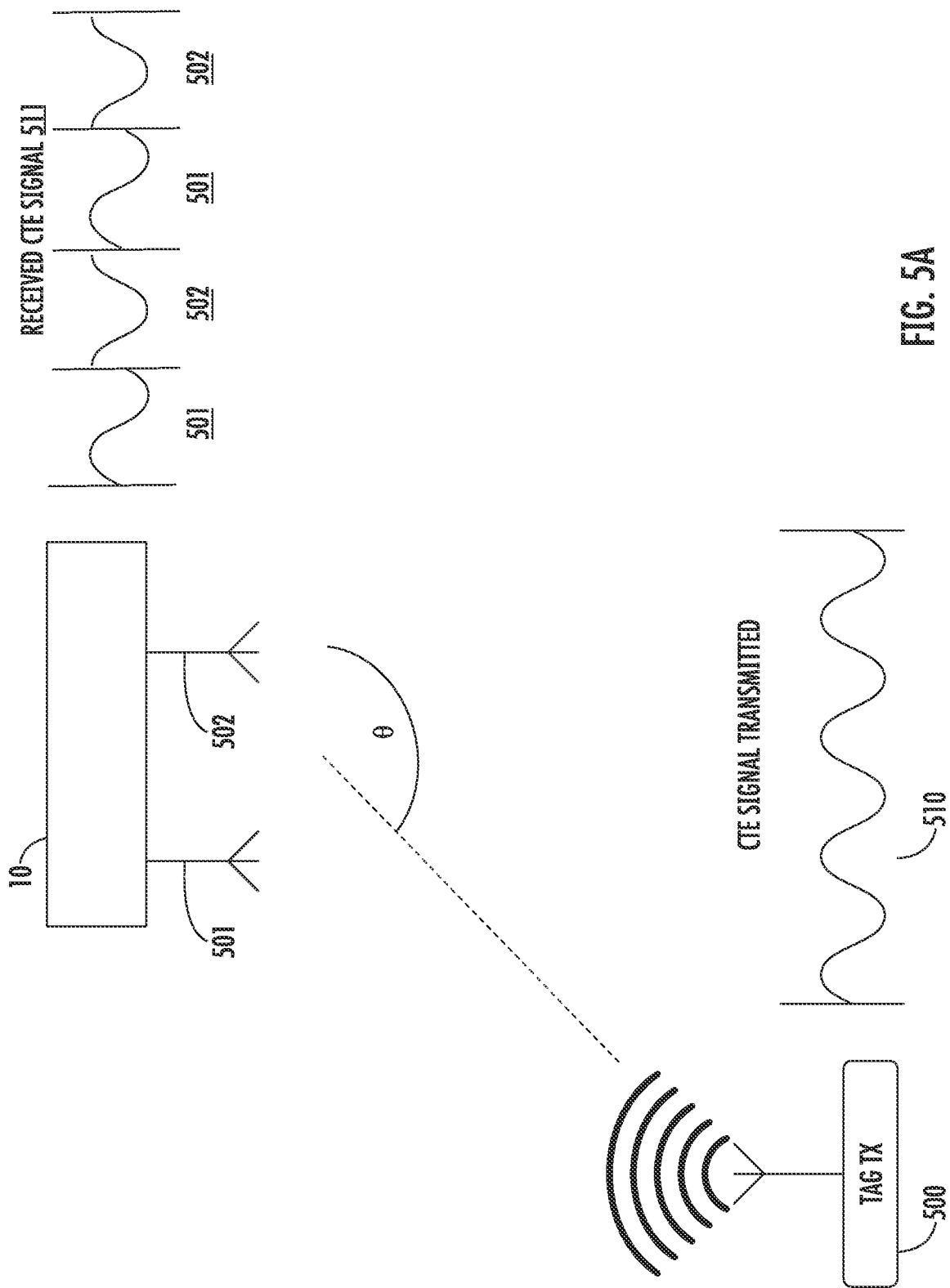

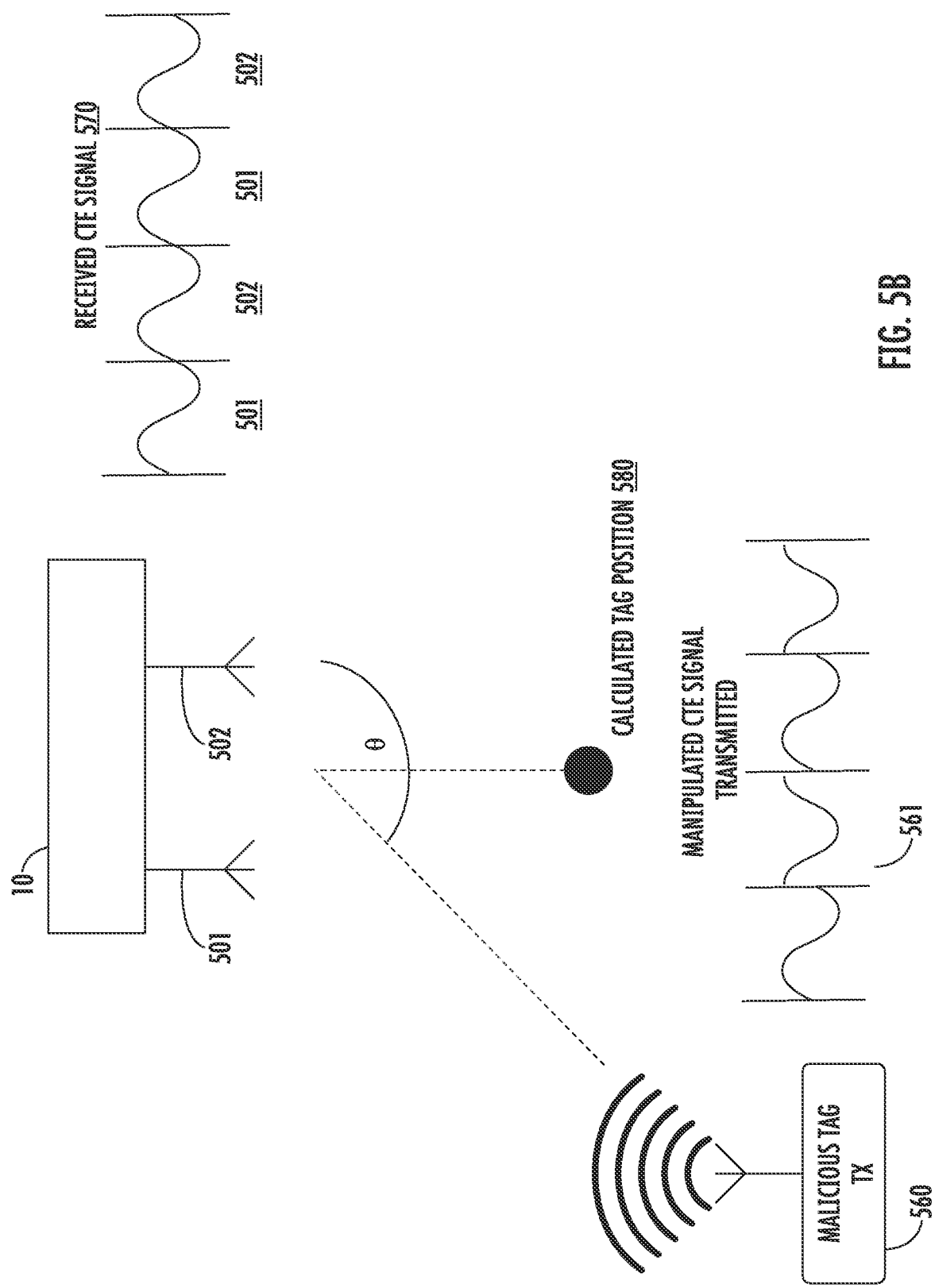

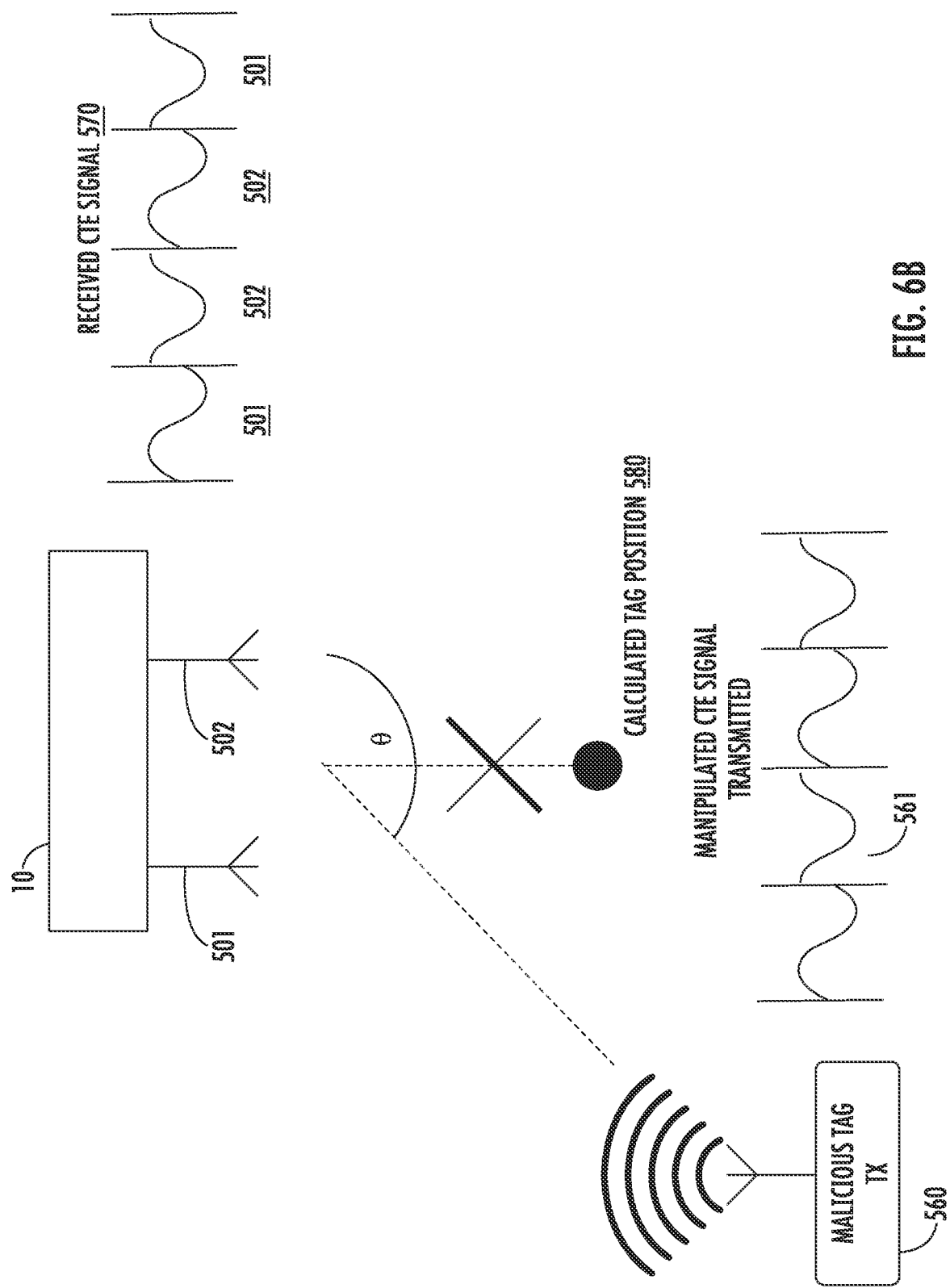

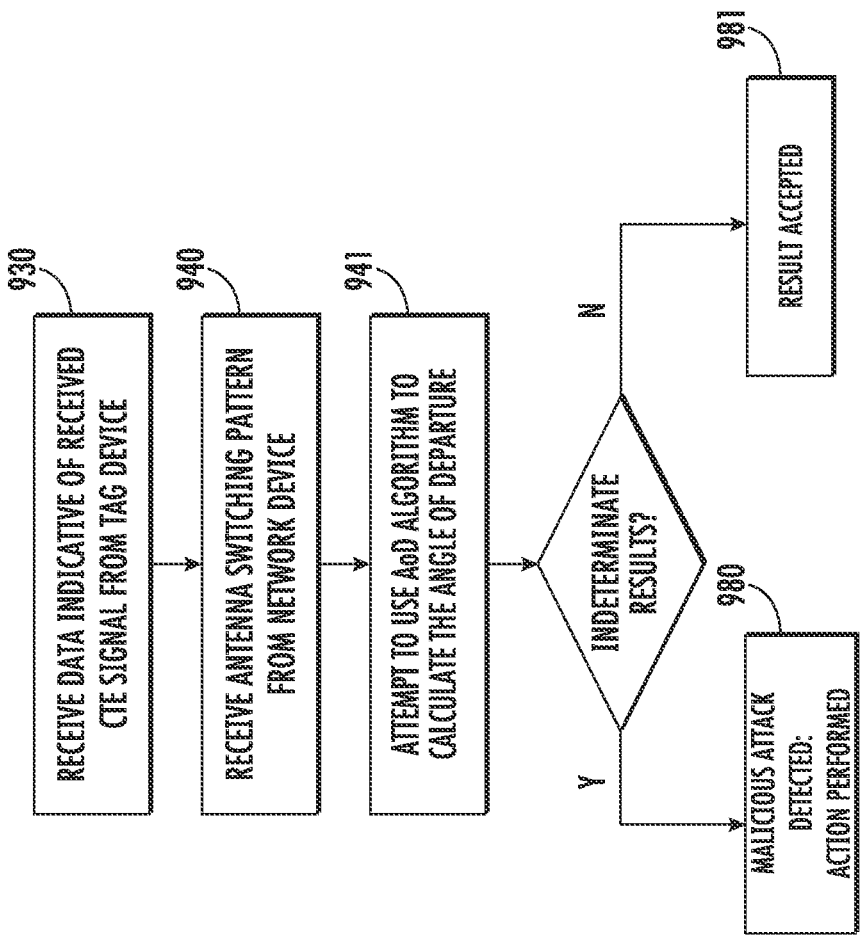
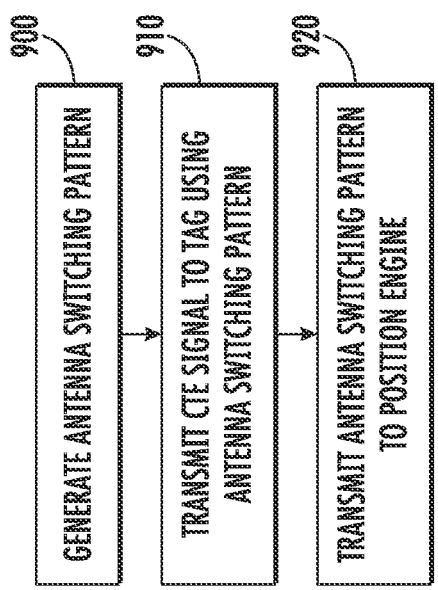
FIG. 10B

SYSTEM AND METHOD FOR PHASE MANIPULATION ATTACK PROTECTION AND DETECTION IN AOA AND AOD

This disclosure describes systems and methods for detecting and protecting against a phase manipulation attack by generating random antenna switching patterns in Angle of Arrival (AoA) or Angle of Departure (AoD) applications.

BACKGROUND

Angle of Arrival and Angle of Departure algorithms, collectively referred to as AoX algorithms, operate by determining a phase difference between different antenna elements in an antenna array. The antenna array may be a one or two dimensional array. This phase difference can be used to determine the angle from which the signal originated, since the distance between antenna elements is known.

Specifically, assume a one dimensional antenna array where the distance between two adjacent antenna elements is d. The phase difference between when the incoming signal is detected at these two adjacent antennas can be given as $\varphi$. This phase difference, $\varphi$, divided by $2\pi$, multiplied by the wavelength, $\lambda$, represents the distance between the two antenna elements, as viewed from the signal source. Knowing this difference in the distance that the incoming signal travelled allows the angle of arrival to be calculated. Specifically, the angle of arrival can be given by the difference in the distance that the incoming signal travelled, divided by d represents the cosine of the incoming signal. In other words, the angle of arrival is defined as the arc cosine of $(\varphi\lambda/2\pi)/d$.

This algorithm, and others, relies on the accuracy of several parameters. Specifically, the distance between adjacent antenna elements must be accurate. This is typically not problematic, as the geometry of the antenna array is well defined. The algorithm also relies on the incoming signal. Specifically, the algorithms assume that the incoming signal is a continuous pattern. In many systems, it is assumed that the incoming signal is non-varying such that phase differences between different antenna elements can be used to determine the direction of the incoming signal.

However, a malicious device may manipulate the transmitted signal in an attempt to confuse the locator device so that the locator believes that the malicious device is located in a position that is different from its actual location. This may have serious implications in applications such as access control, visitor management, store theft prevention and product monitoring, collision avoidance, danger zone detection, automated emergency procedures and others. For example, by pretending to be located elsewhere, the owner of a malicious tag may prevent access control alarms from triggering when entering restricted areas. The malicious tag owner can then disrupt the location system operation, causing serious health or financial implications . . . .

Similar issues exist with respect to Angle of Departure applications.

Therefore, it would be beneficial if there were a system and method that could determine that the incoming signal has been manipulated by a malicious device and ignore the location data associated with the malicious device.

SUMMARY

Systems and methods for detecting and protecting against phase manipulation during angle of arrival or angle of departure operations are disclosed. For angle of arrival operations, the network device receiving the constant tone extension (CTE) generates an antenna switching pattern. The antenna switching pattern may be randomly generated each time an AoA operation is to be performed. The network device then receives the CTE using the plurality of antenna elements. In one embodiment, the network device compares the phase of portions of the CTE signal received during different sample slots that utilize the same antenna element. If the phase of these portions differs by more than a threshold, the network device detects a malicious attack and acts accordingly. In another embodiment, if the AoA algorithm cannot determine the angle of arrival, the network device detects a malicious phase attack and acts accordingly. For angle of departure operations, the network device that transmits the CTE signal generates an antenna switching pattern. This antenna switching pattern is also transmitted to the position engine, which performs the comparisons described above.

According to one embodiment, a system to detect a malicious attack during an Angle of Departure operation is disclosed. The system comprises a network device, comprising: a wireless network interface, wherein the wireless network interface comprises an antenna array having a plurality of antenna elements and an analog multiplexer, wherein the wireless network interface transmits a signal from an antenna element of the antenna array; a processing unit; and a memory device, comprising instructions, which when executed by the processing unit, enable the network device to: generate an antenna switching pattern; transmit a packet that includes a constant tone extension (CTE) to a tag device, wherein the CTE comprises a tone having a known frequency and wherein the CTE comprises a plurality of switch slots and a plurality of sample slots, wherein the antenna element used to transmit the CTE during each sample slot is determined from the antenna switching pattern; and transmit the antenna switching pattern to a position engine; and the position engine, comprising: a wireless network interface, wherein the wireless network interface comprises an antenna; a processing unit; and a memory device, comprising instructions, which when executed by the processing unit, enable the position engine to: receive the antenna switching pattern from the network device; receive data indicative of a received CTE signal from the tag device; and based on phase information obtained from the data indicative of the received CTE signal, perform an action if a malicious phase attack is detected. In certain embodiments, the action is selected from the group consisting of: discarding location information for the tag device; alerting an operator; logging an incident; and changing a radio parameter. In certain embodiments, the antenna switching pattern is randomly generated. In some embodiments, the instructions enable the position engine to: attempt to determine an angle of departure based on the phase information from the data indicative of the received CTE using an AoD algorithm; and if the AoD algorithm cannot identify the angle of departure, detect a malicious phase attack and perform the action in response to a detection of the malicious attack. In certain embodiments, the instructions enable the position engine to: compare the phase of two portions of the data indicative of the received CTE signals that were transmitted by the network device using a first antenna element; and if the difference between the phases of the two portions of data indicative of the received CTE signal transmitted using the first antenna element is greater than a threshold, perform the action in response to a detection of the malicious attack. In some further embodiments, the instructions enable the position engine to: compare the phase of two portions of the received CTE signal that were transmitted by the network device using a second antenna element; and if the difference between the phases of the two portions of the received CTE signal transmitted using the second antenna element is greater than the threshold, perform the action in response to the detection of a malicious attack. In some further embodiments, the instructions enable the position engine to: calculate an angle of departure for the tag device if the difference is less than the threshold.

According to another embodiment, a method of detecting a malicious attack during an Angle of Departure operation is disclosed. The method comprises using a network device having a wireless network interface, wherein the wireless network interface comprises an antenna array having a plurality of antenna elements and an analog multiplexer, to generate an antenna switching pattern; using the network device to transmit a packet to a tag device that includes a constant tone extension (CTE), wherein the CTE comprises a tone having a known frequency and wherein the CTE comprises a plurality of switch slots and a plurality of sample slots, wherein the antenna element used to transmit the CTE during each sample slot is determined from the antenna switching pattern; transmitting the antenna switching pattern from the network device to a position engine; receiving, at the position engine, data indicative of the CTE signal received by the tag device; and performing an action, based on phase information obtained from the data indicative of the received CTE, in response to a detected malicious attack. In certain embodiments, the action is selected from the group consisting of: discarding location information for the tag device; alerting an operator; logging an incident; and changing a radio parameter. In certain embodiments, the antenna switching pattern is randomly generated. In certain embodiments, the position engine detects a malicious attack by: attempting to determine an angle of departure based on phase information from the data indicative of the received CTE using an AoD algorithm; and if the AoD algorithm cannot identify the angle of departure, detecting the malicious phase attack. In some embodiments, the position engine detects a malicious attack by: comparing the phase of two portions of the data indicative of the received CTE signal that were transmitted by the network device using a first antenna element; and if the difference between the phases of the two portions of the received CTE signal is greater than a threshold, detecting the malicious attack. In certain further embodiments, the position engine detects a malicious attack by: comparing the phase of two portions of the data indicative of the received CTE signal that were transmitted by the network device using a second antenna element; and if the difference between the phases of the two portions of the data indicative of the received CTE signal transmitted by the second antenna element is greater than the threshold, detecting the malicious attack. In some further embodiments, the position engine calculates an angle of departure for the tag device if the difference is less than the threshold.

According to another embodiment, a software program, comprising a first portion and a second portion, disposed on a non-transitory storage media, is disclosed. The software program comprises instructions, wherein, when the first portion is executed by a processing unit disposed on a network device comprising a wireless network interface, wherein the wireless network interface comprises an antenna array having a plurality of antenna elements, enables the network device to: generate an antenna switching pattern; transmit a packet that includes a constant tone extension (CTE) to a tag device, wherein the CTE comprises a tone having a known frequency and wherein the CTE comprises a plurality of switch slots and a plurality of sample slots, wherein the antenna element used to transmit the CTE during each sample slot is determined from the antenna switching pattern; and transmit the antenna switching pattern to a position engine; and wherein, when the second portion is executed by a processing unit disposed on the position engine comprising a wireless network interface, enables the position engine to: receive the antenna switching pattern from the network device; receive data indicative of a received CTE signal from the tag device; perform an action, based on phase information obtained from the data indicative of the received CTE, in response to a detected malicious attack. In certain embodiments, the action is selected from the group consisting of: discarding location information for the tag device; alerting an operator; logging an incident; and changing a radio parameter. In certain embodiments, the antenna switching pattern is randomly generated. In certain embodiments, the second portion comprises instructions, which, when executed by the processing unit disposed on the position engine, enable the position engine to detect a malicious attack by: attempting to determine an angle of departure based on the phase information from the data indicative of the received CTE using an AoD algorithm; and if the AoD algorithm cannot identify the angle of departure, detecting the malicious attack. In some embodiments, the second portion comprises instructions, which, when executed by the processing unit disposed on the position engine, enable the position engine to detect a malicious attack by: comparing the phase of two portions of the data indicative of the received CTE signal that were transmitted by the network device using the first antenna element; and if the difference between the phases of the two portions of the received CTE signal is greater than a threshold, detecting the malicious attack. In some further embodiments, the second portion comprises instructions, which, when executed by the processing unit disposed on the position engine, enable the position engine to: compare the phase of two sample slots of the received CTE signal that were transmitted by the network device using the second antenna element; and if the difference between the phases of the two portions of the received CTE signal is greater than the threshold, perform the action in response to the detection of a malicious attack. In some further embodiments, the second portion comprises instruction, which, when executed by the processing unit disposed on the position engine, enable the position engine to: calculate an angle of departure for the tag device if the difference is less than the threshold.

BRIEF DESCRIPTION OF THE DRAWINGS

For a better understanding of the present disclosure, reference is made to the accompanying drawings, in which like elements are referenced with like numerals, and in which:

FIG. 3A-3C shows the format of a representative direction detection message transmitted to the system of FIG. 1;

FIG. 4B is a manipulated CTE pattern according to one embodiment;

FIG. 5A shows a system for performing Angle of Arrival operations according to one embodiment;

FIG. 5B shows the system of FIG. 5A wherein a malicious tag device has manipulated the CTE signal;

FIG. 6B shows the system of FIG. 6A wherein the network device has detected that a malicious tag device has manipulated the CTE signal;

FIG. 10B shows a sequence of operations performed by the network device and the position engine during an AoD operation according to another embodiment.

DETAILED DESCRIPTION

Location systems are used to locate or track items and optionally people, provide directions and find other important information within buildings and facilities such as airports, shopping malls and others. Some systems also rely on these location systems as a security measure. A malicious attack may be used to either change the location of a tag device or to spoof a tag device in a location where there is no tag device. These malicious attacks may rely on the phase manipulation of the CTE signal that is transmitted during the Angle of Arrival or Angle of Departure (collectively AoX) operation. Systems and method to detect this phase manipulation are described below.

Figure 1:
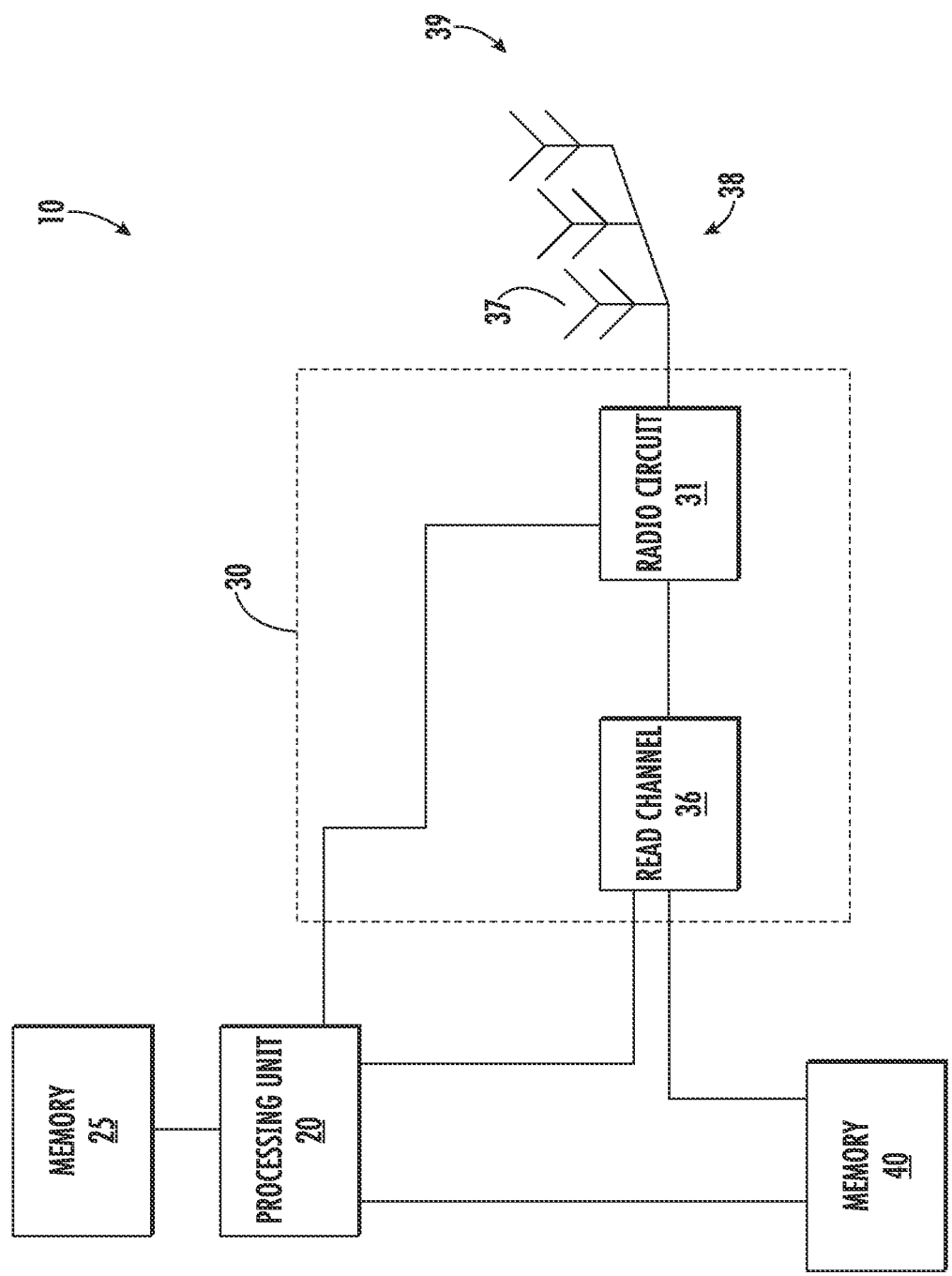
FIG. 1 is a block diagram of a network device that may be used to perform the method described herein.

FIG. 1 shows a network device that may be used to perform the phase manipulation detection described herein. This phase manipulation detection may be utilized with angle of arrival (AoA) or angle of departure (AoD) algorithms.

The network device 10 has a processing unit 20 and an associated memory device 25. The processing unit 20 may be any suitable component, such as a microprocessor, embedded processor, an application specific circuit, a programmable circuit, a microcontroller, or another similar device. The memory device 25 contains the instructions, which, when executed by the processing unit 20, enable the network device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM. The instructions contained within the memory device 25 may be referred to as a software program, which is disposed on a non-transitory storage media.

The network device 10 also includes a network interface 30, which may be a wireless network interface that includes an antenna array 38. The antenna array 38 may comprise a plurality of antenna elements 37. The antenna array 38 may comprise 2, 4, 8, 16 or another number of antenna elements 37. In some embodiments, the antenna array 38 comprises more than two antenna elements 37. The network interface 30 may support any wireless network protocol that supports AoX determination, such as Bluetooth. The network interface 30 is used to allow the network device 10 to communicate with other devices disposed on the network 39.

The network interface 30 include radio circuit 31. This radio circuit 31 is used to process the incoming signal and convert the wireless signals to digital signals. The components within the radio circuit 31 are described in more detail below.

The network interface 30 also includes a read channel 36. The read channel 36 is used to receive, synchronize and decode the digital signals received from the radio circuit 31. Specifically, the read channel 36 has a preamble detector that is used to identify the start of an incoming packet. The read channel 36 also has a sync detector, which is used to identify a particular sequence of bits that are referred to as a sync character. Additionally, the read channel 36 has a decoder which is used to convert the digital signals into properly aligned bytes of data.

The network device 10 may include a second memory device 40. Data that is received from the network interface 30 or is to be sent via the network interface 30 may also be stored in the second memory device 40. This second memory device 40 is traditionally a volatile memory.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language, which is not limited by this disclosure. Thus, in some embodiments, there may be multiple computer readable non-transitory media that contain the instructions described herein. The first computer readable non-transitory media may be in communication with the processing unit 20, as shown in FIG. 1. The second computer readable non-transitory media may be a CDROM, or a different memory device, which is located remote from the network device 10. The instructions contained on this second computer readable non-transitory media may be downloaded onto the memory device 25 to allow execution of the instructions by the network device 10.

While the processing unit 20, the memory device 25, the network interface 30 and the second memory device 40 are shown in FIG. 1 as separate components, it is understood that some or all of these components may be integrated into a single electronic component. Rather, FIG. 1 is used to illustrate the functionality of the network device 10, not its physical configuration.

Although not shown, the network device 10 also has a power supply, which may be a battery or a connection to a permanent power source, such as a wall outlet.

Figure 2:
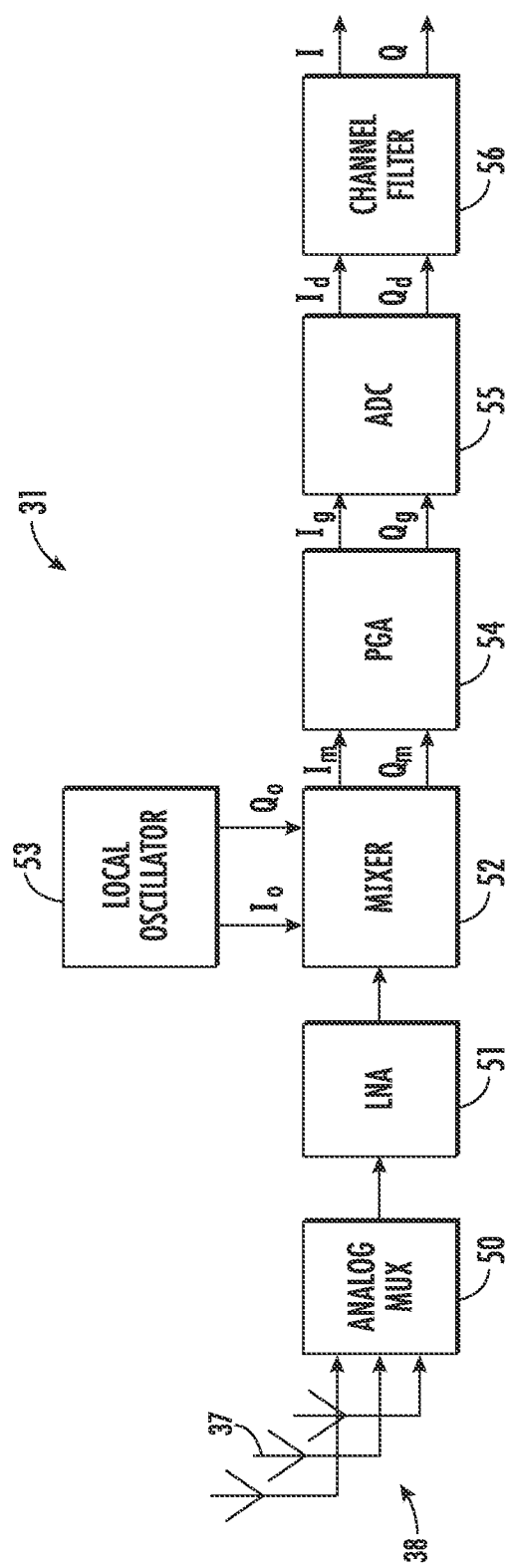
FIG. 2 is a block diagram of the radio receiver of the network device of FIG. 1.

FIG. 2 shows a block diagram of the radio circuit 31. The wireless signals first enter the radio circuit 31 through one antenna element 37 of the antenna array 38. The antenna array 38 may be a one dimensional array, such as a linear array. Alternatively, the antenna array 38 may be a two dimensional array, such as a M×N array. An analog multiplexer 50 may be used to select one antenna element 37 from the antenna array 38. Once selected, this antenna element 37 is in electrical communication with a low noise amplifier (LNA) 51. The LNA 51 receives a very weak signal from the antenna element 37 and amplifies that signal while maintaining the signal-to-noise ratio (SNR) of the incoming signal. The amplified signal is then passed to a mixer 52. The mixer 52 is also in communication with a local oscillator 53, which provides two phases to the mixer 52. The cosine of the frequency may be referred to as $I_o$, while the sin of the frequency may be referred to as $Q_o$. The $I_o$ signal is then multiplied by the incoming signal to create the inphase signal, $I_m$. The $Q_o$ signal is then multiplied by a 90° delayed version of the incoming signal to create the quadrature signal, $Q_m$. The inphase signal, $I_m$, and the quadrature signal, $Q_m$, from the mixer 52 are then fed into programmable gain amplifier (PGA) 54. The PGA 54 amplifies the $I_m$ and $Q_m$ signals by a programmable amount. These amplified signals are referred to as $I_g$ and $Q_g$. The amplified signals, $I_g$ and $Q_g$, are then fed from the PGA 54 into an analog to digital converter (ADC) 55. The ADC 55 converts these analog signals to digital signals, $I_d$ and $Q_d$. These digital signals may pass through channel filter 56 then exit the radio circuit 31 as I and Q signals (in-phase and quadrature). In certain embodiments, the I and Q values may be considered complex numbers, wherein the I value is the real component and the Q value is the imaginary component.

The I and Q signals may then enter a CORDIC (Coordination Rotation Digital Computer), which determines the amplitude and phase of the signals. Amplitude is given as the square root of $I^2$ and $Q^2$, while phase is given by the $\tan^{-1}$ (Q/I). The CORDIC may be disposed in the radio circuit 31, or elsewhere within the network interface 30. In certain embodiments, the CORDIC may be implemented in software.

In certain embodiments, the network interface 30 operates on a wireless network that utilizes the Bluetooth network protocol. FIG. 3A shows the format of a special Bluetooth packet that is used for direction detection. These packets typically begin with a preamble 300, an address field 310, a payload 320 and a checksum or CRC 330. However, the special packets also include a constant tone extension (CTE) 340. FIGS. 3B and 3C show two different formats for the CTE 340. In both formats, the CTE 340 includes a guard period 341, a reference period 342, and a plurality of switch slots 343 and sample slots 344. The duration of each switch slot 343 and sample slot 344 may be 1 μsec or 2 μsec, as shown in FIGS. 3B and 3C, respectively. The CTE 340 is a special extension to the Bluetooth packet that transmits a constant frequency, such as a 250 kHz tone. For example, the CTE 340 may be a string of consecutive "1"s. The CTE 340 may be as long as 160 μsec and as short as 16 μsec. In practice, the network device 10 uses a single antenna element 37 of the antenna array 38 to receive the CTE 340 during the guard period 341 and the reference period 342. The network device 10 then switches to another antenna element 37 during each switch slot 343 by changing the selection of the analog multiplexer 50 in the radio circuit 31. The network device 10 samples the tone again with that new antenna element 37 during the sample slot 344. The network device 10 continues switching the antenna element 37 during each switch slot 343 and sampling the tone during the sample slot 344. If there are more sample slots 344 than antenna elements, the network device 10 may return to the first antenna element 37 and repeat the sequence. One set of samples, wherein each antenna element has been used to sample the CTE 340 exactly once may be referred to as a snapshot. The order in which the network device 10 selects the different antenna elements 37 may be referred to as the antenna switching pattern.

During the entirety of the CTE 340, the sending device is transmitting a tone at a constant known frequency. As stated above, the network device 10 may receive that tone using one antenna element 37 of the antenna array. Specifically, the guard period 341 and the reference period 342, which have a combined duration of 12 μsec, are received using the same antenna element 37.

The network device 10 then performs the steps described above to generate the I and Q signals. In certain embodiments, the processing unit 20 samples the I and Q signals at a very high rate, such as 8 times or more faster than the frequency of the incoming tone. For example, if the incoming tone is 250 kHz, an oversample rate of 4.0 MHz (sixteen times oversampling) or 8.0 MHz (thirty two times oversampling) may be used. The I and Q signals then enter a CORDIC, which determines the amplitude and phase of the signals. Amplitude is given as the square root of $I^2$ and $Q^2$, while phase is given by the $\tan^{-1}$ (Q/I).

Figure 4A:
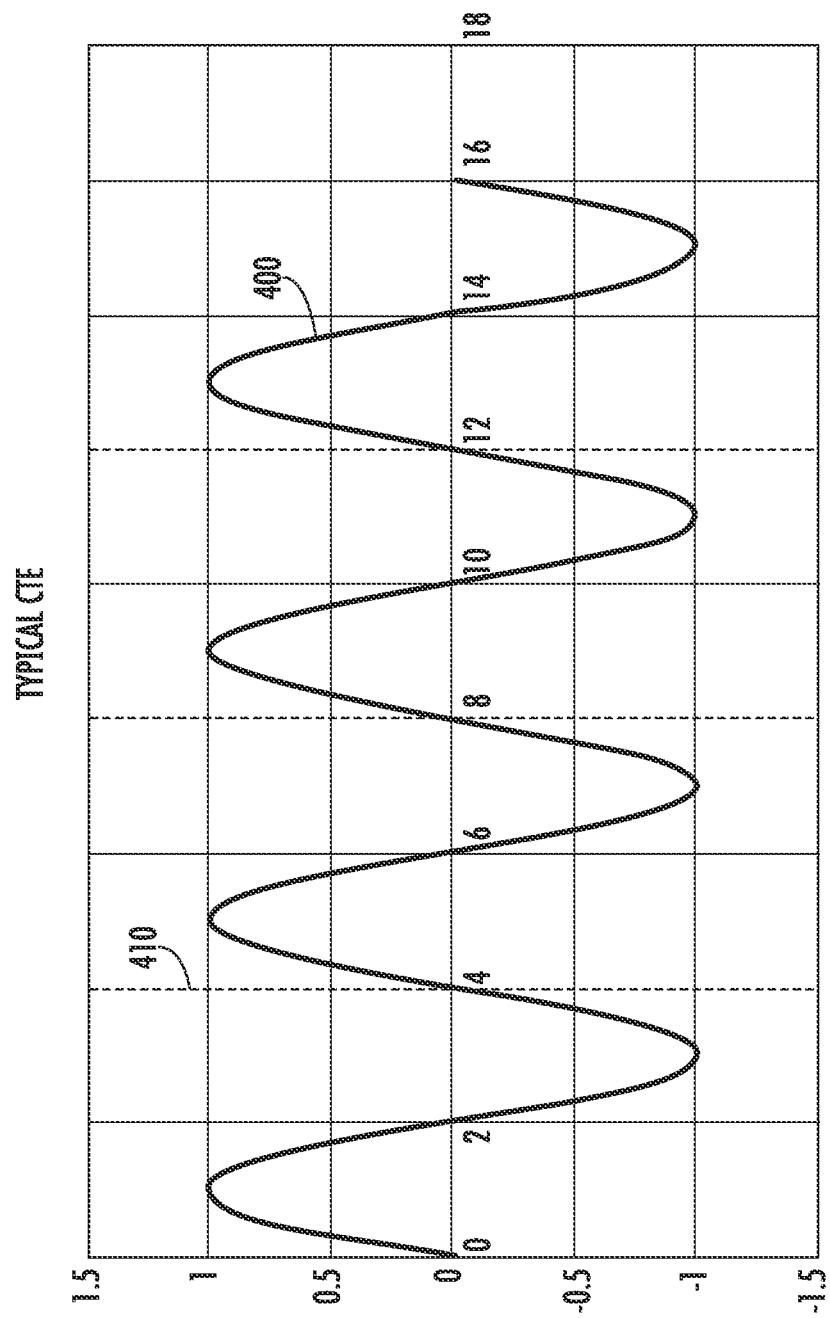
FIG. 4A is a waveform generated from a normal CTE pattern.

FIG. 4A shows a typical CTE pattern 400. In this embodiment, the CTE pattern 400 is a sine wave having a frequency of 250 kHz. The horizontal axis represents time in microseconds. The network device 10 switches from a first antenna element to a second antenna element at time 410. In other words, time 410 may correspond to the start of a switch slot 343. The network device 10 may be configured to start sampling the incoming signal at a known time after the switch slot 343. For example, if the CTE pattern is as shown in FIG. 3B, the network device may start sampling the incoming signal 1 μsecond after time 410. Since the total duration of the switch slot 343 and the sample slot 344 is 2 μseconds, the phase of the even numbered sample slots may be 180° out of phase with the odd numbered sample slots. Since the CTE pattern 400 is constant, the phase difference between the signal received by the first antenna element and the second antenna element is entirely due to the difference in the distance that the CTE pattern travelled with respect to the two antenna elements, offset by 180°.

Alternatively, if the CTE pattern is as shown in FIG. 3C, the network device 10 may start sampling the incoming signal 2 μseconds after time 410. Since the total duration of the switch slot 343 and the sample slot 344 is 4 μseconds, the phase of the even numbered sample slots may be in phase with the odd numbered sample slots. Since the CTE pattern 400 is constant, the phase difference between the signal received by the first antenna element and the second antenna element is entirely due to the difference in the distance that the CTE pattern travelled with respect to the two antenna elements.

To determine the phase of the incoming signal, the network device 10 may use the I and Q signals. In one embodiment, the network device 10 uses the output of the CORDIC, namely the phase, which is given by the $\tan^{-1}$ (Q/I). In another embodiment, the network device 10 uses the output of the CORDIC, namely the amplitude, which is given as the square root of $I^2$ plus $Q^2$. In another embodiment, the network device 10 uses both parameters to determine the phase of the incoming signal during each sample slot 344. As noted above, to correctly determine the phase, the network device 10 must begin sampling at the same time after the start of each switch slot 343. In this way, there is no phase offset due to sampling inaccuracies.

FIG. 4B shows a manipulated CTE pattern 450. In this embodiment, the manipulated CTE pattern 450 is a sine wave having a frequency of 250 kHz, but having phase discontinuities. For example, time 460 may correspond to the start of a switch slot 343. However, unlike the normal CTE pattern 400, a phase shift equal to 45° in introduced into the manipulated CTE pattern 450 at time 460. Therefore, when the network device 10 switches antenna elements, the phase difference between the signal received by the first antenna element and the second antenna element is based partly on the difference in the transmission distance, and partly on the phase discontinuity of the manipulated CTE pattern 450. However, since the network device 10 is unaware of the discontinuity in the manipulated CTE pattern 450, it attributes the entire phase difference to the difference in transmission distance. This results in an erroneous determination of the angle of arrival of the incoming signal.

For example, FIG. 5A shows a network device 10 having two antenna elements 501, 502. A tag device 500 is also shown. The tag device 500 may have many of the components described above with respect to the network device 10. However, the tag device 500 often does not have an antenna array; rather the tag device 500 typically has a single antenna element. Thus, the tag device may not include the analog multiplexer shown in FIG. 2. Further, the processing power of the tag device 500 and the memory capability of the tag device 500 may be less than that of the network device 10. Finally, the tag device 500 may be battery powered.

The tag device 500 transmitting the CTE signal is located at an angle θ from the network device 10. The tag device 500 transmits a CTE pattern 510 having a continuous sine wave. The network device 10, in this embodiment, has two antenna elements. Thus, the network device 10 receives the CTE signal on the first antenna element 501 and, during the switch slot 343, switches the antenna element and then receives the CTE signal on the second antenna element 502. The network device 10 may switch between these two antenna elements a plurality of times.

Further, while FIG. 5A shows a network device 10 having two antenna elements, the disclosure is not limited to this embodiment. The network device 10 may include any number of antenna elements. In this embodiment, the network device 10 uses a simple antenna switching pattern. For example, the network device 10 may sequentially switch to the next antenna element. For example, if there were N antenna elements, the network device 10 may sample each antenna element in order and then return to the first antenna element. Thus, the antenna switching pattern may be 1, 2, . . . N, 1, 2, . . . N, etc.

The received CTE signal 511 is also shown, where the phase discontinuity is due to the difference in transmission distance between the first antenna element 501 and the second antenna element 502. The antenna element that received each portion of the received CTE signal 511 is shown below the CTE signal 511. As shown in CTE signal 511, the phase of the portion of the received CTE signal 511 received by second antenna element 502 is delayed by about 90°. The network device 10 may then calculate the angle of arrival based on this received CTE signal 511, using any known AoX algorithm, such as MUSIC.

The multiple signal classification (MUSIC) algorithm utilizes phase information to determine the direction of arrival. The MUSIC algorithm creates a one or two dimensional graph, depending on the configuration of the antenna array, where each peak on the graph represents a direction of arrival for an incoming signal. This one or two dimensional graph may be referred to as a pseudo-spectrum. The MUSIC algorithm calculates a value for each point on the graph. Stated differently, a peak in the pseudo-spectrum corresponds to the angle of some signal entering the antenna array.

While this disclosure describes use of the MUSIC algorithm, other algorithms may also be used. For example, the Minimum Variance Distortionless Response (MVDR) beamformer algorithm (also referred to as Capon's beamformer), the Bartlett beamformer algorithm, and variations of the MUSIC algorithm may also be used. In each of these, the algorithms use different mathematical formulas to calculate the spectrum, but each calculates a spectrum which can be used in the present disclosure.

There are two ways in which the tag position may be manipulated.

In one embodiment, shown in FIG. 5B, a malicious tag device 560 may transmit a manipulated CTE signal 561. The network device 10 uses the first antenna element 501 and second antenna element 502 to capture the received CTE signal 570. Again, as described above, the network device 10 uses a simple antenna switching pattern. For example, the network device 10 may sequentially switch to the next antenna element. For example, if there were N antenna elements, the network device 10 may sample each antenna element in order and then return to the first antenna element. Thus, the antenna switching pattern may be 1, 2, . . . N, 1, 2, . . . N, etc.

Note that, in this example, the phase difference caused by the difference in transmission distance is offset by the phase manipulation introduced by the malicious tag device 560. Consequently, the network device 10 will detect a received CTE signal 570 wherein the portion of the CTE signal received by each antenna element has the same phase. Thus, the network device 10 may determine that the calculated tag position 580 is located halfway between the first antenna element 501 and the second antenna element 502, based on this received CTE signal 570.

There are other ways in which the CTE signal may be manipulated. For example, an attacker tag may overwrite portions of the CTE signal transmitted by a tag device, so as to change the calculated location of that tag device.

Note that if the CTE signal is as shown in FIG. 3B, and only one antenna element is utilized, each even numbered sample slot will have the same phase, $\varphi$, while the odd numbered sample slots will have a phase that is offset by 180° from this phase, or $\varphi+180°$. Similarly, if the CTE signal is as shown in FIG. 3C, and only one antenna element is utilized, each sample slot 344 will have the same phase, $\varphi$.

Figure 6A:
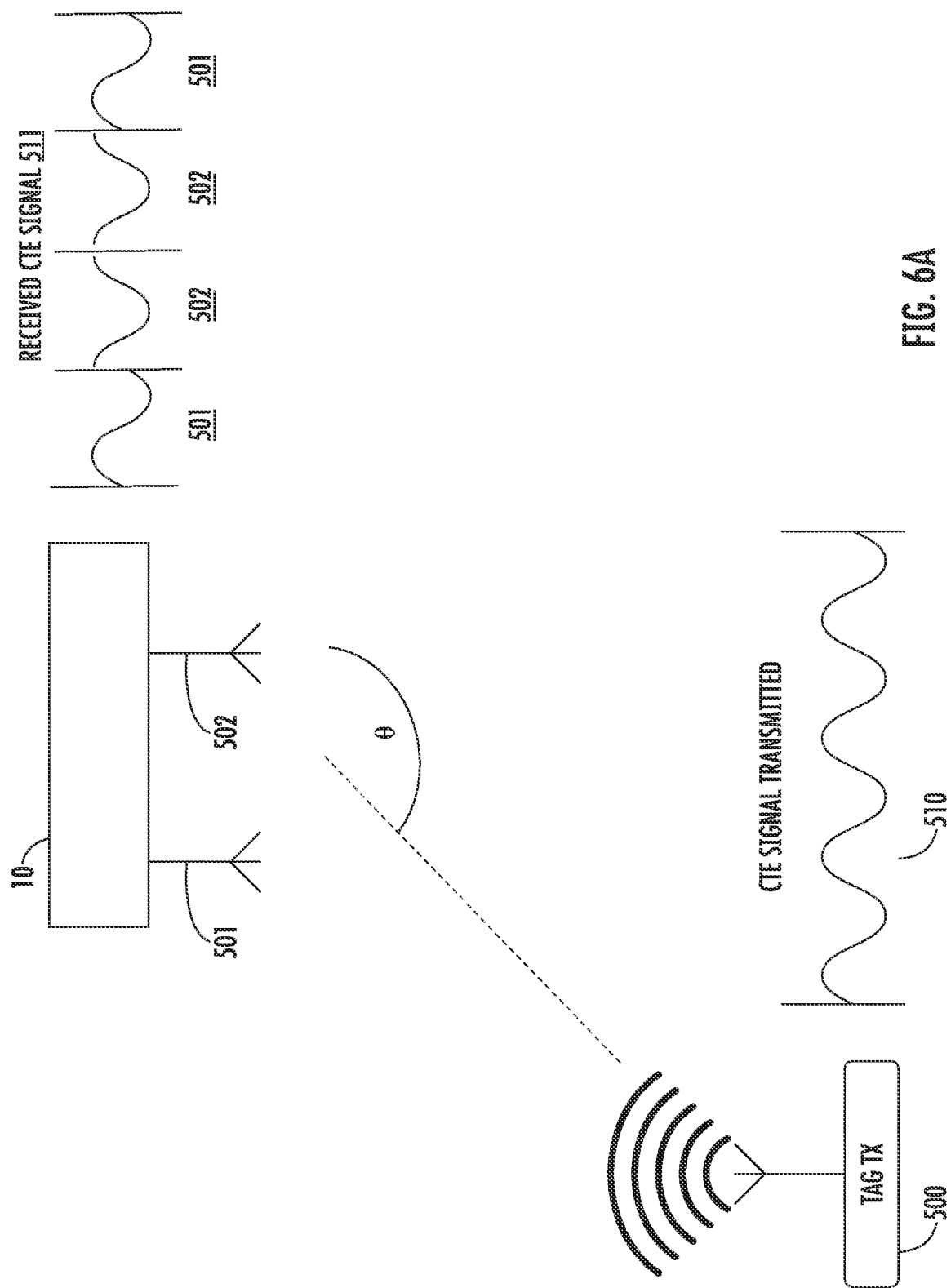
FIG. 6A shows a system for detecting phase manipulation of the CTE signal.

This relationship may be used to determine whether the CTE signal is being manipulated. For example, FIG. 6A shows the situation shown in FIG. 5A. For simplicity, it is assumed that the CTE pattern is as shown in FIG. 3C. However, in this embodiment, the antenna switching pattern has been changed, such that the first antenna element 501 is used, the second antenna element 502 is used to sample the incoming signal for two consecutive sample slots, and finally the first antenna element 501 is used again. Note that, in this embodiment, the received CTE signal 511 shows that the phase received by the first antenna element 501 is the same for both slots. Similarly, the phase received by the second antenna element 502 is the same for both slots. Thus, the network device 10 may determine that the incoming signal has not been manipulated.

FIG. 6B shows the situation shown in FIG. 5B. For simplicity, it is assumed that the CTE pattern is as shown in FIG. 3C. However, in this embodiment, the antenna switching pattern has been changed, such that the first antenna element 501 is used, the second antenna element 502 is used to sample the incoming signal for two consecutive sample slots, and finally the first antenna element 501 is used again. Note that, in this embodiment, the received CTE signal 511 shows that the phase received by the first antenna element 501 is different for the two slots. Similarly, the phase received by the second antenna element 502 is also different for the two slots. However, as described above, the phase received by a particular antenna element should be the same for all sample slots, assuming the CTE signal of FIG. 3C. Consequently, the network device 10 may determine that the incoming signal has been manipulated. In response, the network device may provide an alert that a malicious tag device 560 is attempting to manipulate the CTE signal in the network. Further, the network device 10 may discard the location information for this malicious tag device 560.

This technique is also applicable when an attacker tag may overwrite the CTE signal from a tag device, so as to change its calculated location. Specifically, the network device 10 will detect that the phase of the CTE signal that was received during two or more sample slots by one antenna element differed.

Additionally, in some embodiments, the network device 10 may also compare the amplitude of two sample slots that were received by the same antenna element.

Note that the clock used by the network device 10 may be slightly different from the clock used by the tag device to generate the CTE signal. Therefore, in certain embodiments, the network device 10 may compare the phase of two or more sample slots that were received using the same antenna element. The network device 10 may have a predetermined threshold, such that if the phases differ by more than this predetermined threshold, the network device 10 may determine that a malicious attack is being performed. In certain embodiments, the predetermined threshold may be less than 5°.

In certain embodiments, the threshold may be adaptive. For example, in noisy environments, the resulting phrase differences between two sample slots may be larger than in a quieter environment. Thus, in certain embodiments, the system may monitor average phase differences between samples received using the same antenna element and determine the threshold based on this average. This average maybe a cumulative average or may be a moving average.

Further, as noted above, if the CTE of FIG. 3B is used, the network device 10 must incorporate any phase difference that exists between even numbered and odd numbered sample slots into its calculations. For example, the network device 10 may add 180° to all odd numbered sample slots and then perform the comparison described above.

Note that the manipulated CTE signal 561 was not detected by the network device 10 when the antenna switching pattern was sequential. In other words, the malicious tag device 560 manipulated the CTE pattern based on an assumption of which antenna element would be used by the network device 10 to receive each sample slot 344. In other words, the malicious tag device 560 may know the configuration of the antenna array in the network device 10, and anticipate the antenna switching pattern based on this configuration.

Thus, in one embodiment, the network device 10 randomizes the antenna switching pattern each time an AoA operation is to be performed. This may be performed using a true random number generator or a cryptographically secure pseudorandom number generator (CSPRNG). In other embodiment, the network device 10 may randomly insert a second sample slot that is used by one of the antenna elements. The important point is that the antenna switching pattern is preferably unpredictable and therefore, impossible to guess.

For example, if there are 37 sample slots and 16 antenna elements, all of the antenna elements may be used for 2 sample slots, and there are 5 additional sample slots. In one embodiment, the order in which the antenna elements are used is randomized, such as using a true random number generator or a CSPRNG algorithm. In another embodiment, these five additional sample slots may be randomly inserted into the sequence and all of these additional may use the same antenna element.

In both instances, the malicious tag device 560 will not be able to correctly predict the antenna switching pattern, and therefore cannot manipulate the CTE pattern in a manner that will be undetected.

Figure 7A:
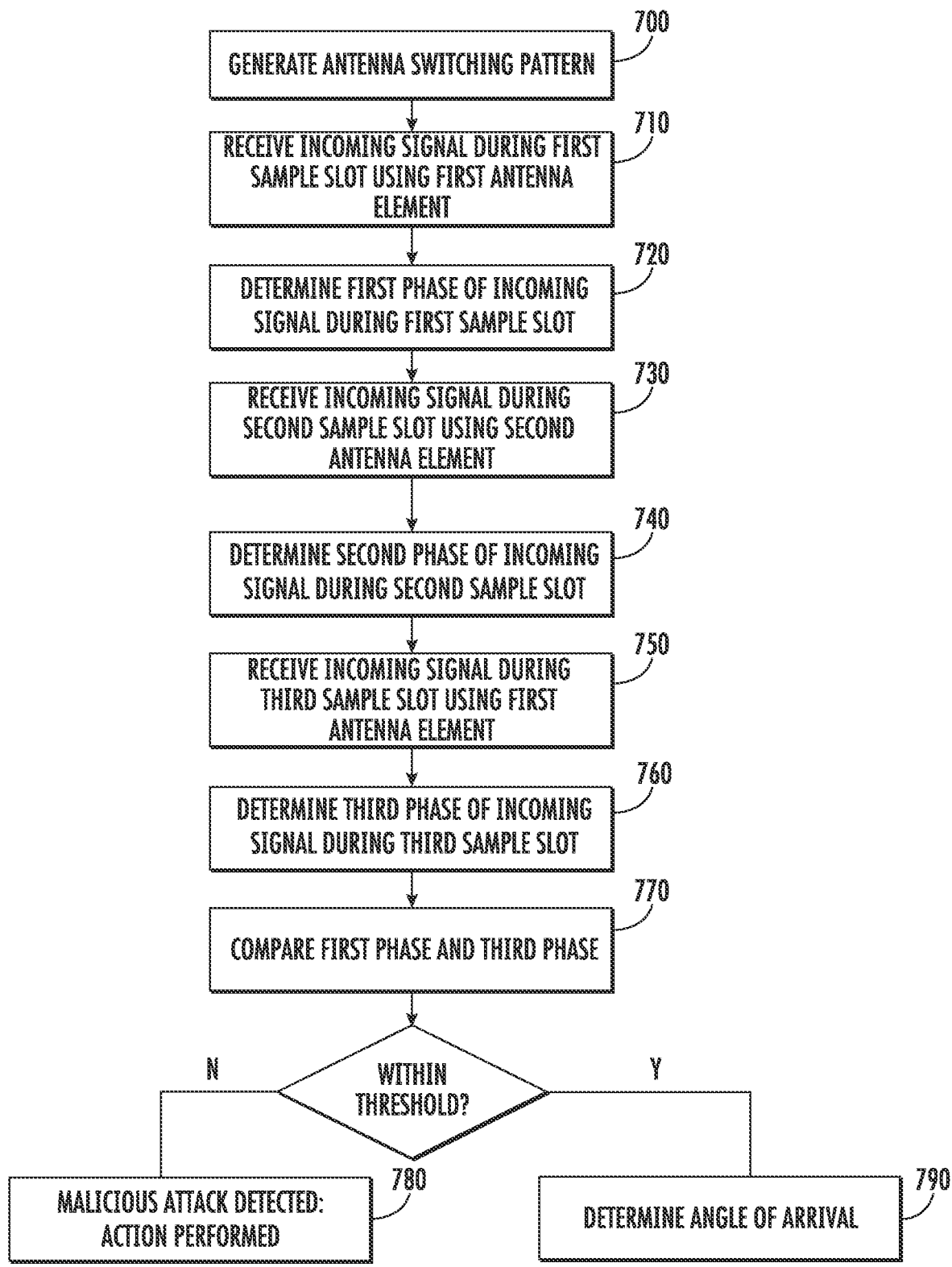
FIG. 7A shows a sequence of operations performed by the network device during an AoA operation according to one embodiment.

FIG. 7 shows a flowchart that may be used by the network device 10 to detect a malicious attack during an AoA operation. First, in certain embodiments, the network device 10 generates the antenna switching pattern, as shown in Box 700. The antenna switching pattern may be randomized. This may be done using a true random number generator, a CSPRNG algorithm or another method. The network device 10 then receives the incoming CTE signal using the antenna switching pattern. As part of receiving the incoming CTE signal, the network device samples a first sample slot of the CTE signal from the tag device using a first of the plurality of antenna elements, as shown in Box 710. The network device 10 may then determine the phase of this first sample slot, referred to as a first phase, as shown in Box 720. Optionally, the network device 10 may also determine the amplitude of this first sample slot. The network device then samples a second sample slot of the CTE signal from the tag device using a second of the plurality of antenna elements, as shown in Box 730. The network device 10 may then determine the phase of this second sample slot, referred to as a second phase, as shown in Box 740. If the network device has more than 2 antenna elements, the network device may select the other antenna elements to use to receive portions of the CTE signal. However, at some point, the network device 10 again uses the first of the plurality of antenna elements to receive a third sample slot, as shown in Box 750. The network device 10 may then determine the phase of this third sample slot, referred to as a third phase, as shown in Box 760. Optionally, the network device 10 may also determine the amplitude of this first sample slot. The network device 10 then compares the first phase and the third phase, as shown in Box 770. If these phases differ by more than a threshold, the network device may perform some action in response to the detection of a malicious attack, as shown in Box 780. If the phases are within the threshold, the network device 10 may determine the angle of arrival, as shown in Box 790. In certain embodiments, the network device 10 may also compare the amplitude of the first sample slot and the third sample slot to detect the malicious attack. In these embodiments, the network device 10 uses both amplitude and phase information.

The action taken in response to the detection of a malicious attack may include providing an alert to an operator, discarding the location information for this tag device, log the incident, change a radio parameter, such as timing, channel, sync word or others in the hope that the malicious tag device cannot follow.

In certain embodiments, Box 740 may not be performed until after the determination is made as to whether a malicious attack is being performed. In this way, less computation power is used.

Additionally, in some embodiments, the CTE may be transmitted in a noisy environment, such that there is noise in the received signal. This noise may result in incorrect phase calculations for the various sample slots. By using this approach, CTE signals with a large amount of noise may fail the comparison (even if there is no malicious attack). Thus, computational power is saved, as the AoA algorithm is not executed on CTE signals with a large amount of noise.

Further, the two sample slots that are used by the first of the plurality of antenna elements may be sequential or non-sequential. Of course, the first of the plurality of antenna elements may be used for more than two sample slots. In addition, the comparison described above may also be performed for one or more additional antenna elements, where these additional antenna elements are used for more than one sample slot. In other words, a fourth sample slot may be received using the second of the antenna elements and a fourth phase may be calculated. The second and fourth phases may also be compared to determine whether a malicious attack is being performed.

While the previous disclosure described the ability to explicit detect a phase manipulation attack, the concepts described herein may be used in other ways. A second mode may be referred to as a protection mode, wherein the network device does not explicitly detect a malicious phase attack, but implicitly detects such an attack.

Figure 7B:
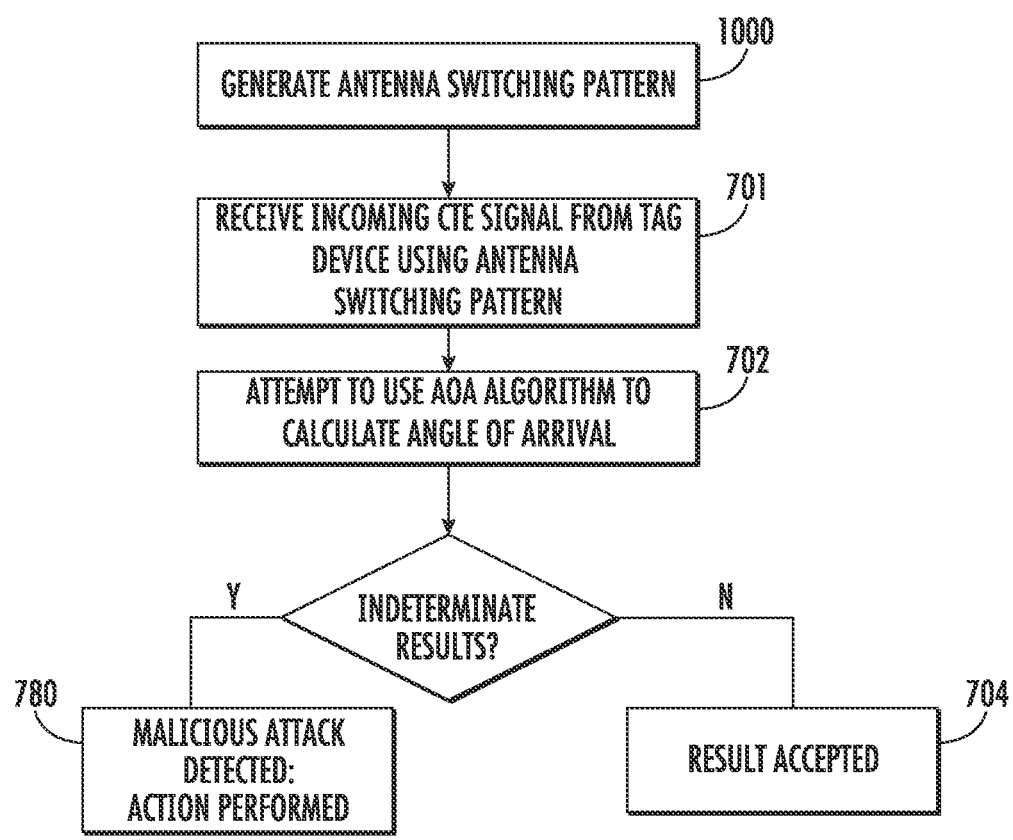
FIG. 7B shows a sequence of operations performed by the network device during an AoA operation according to another embodiment.

For example, as shown in FIG. 7B, the network device 10 may generate an antenna switching pattern before an AoA operation is to be performed, as shown in Box 700. The network device 10 then receives the CTE using this antenna switching pattern, as shown in Box 701. The network device 10 then attempts to calculate the angle of arrival of the signal based on the received CTE signal, as shown in Box 702. This may be done using MUSIC or any other algorithm. If the results are indeterminate, the network device may detect that a malicious attack is underway. The network device 10 may then perform some action, similar to the actions taken above, as shown in Box 780. If the result of the angle of arrival calculation are determinate, the network device 10 may accept the location data, as shown in Box 704.

In both modes, the network device 10 generates an antenna switching pattern. The network device 10 then receives the CTE signal using this antenna switching pattern. Further, in both modes, the network device may identify a malicious phase attack based on the phase information contained within the CTE signal. In the detection mode, the network device 10 may compare the phase of two or more sample slots that were received using the same antenna element to detect a malicious attack. In the protection mode, the phase information is used as an input to the AoA algorithm. If the algorithm cannot resolve the AoA based on this phase information, the network device 10 may detect a malicious phase attack. In both modes, a malicious phase attack is identified. In the event of a detected malicious phase attack, the network device 10 may take some action, such as discarding the location data, alerting an operator, logging the incident or changing radio parameters.

Figure 8A:
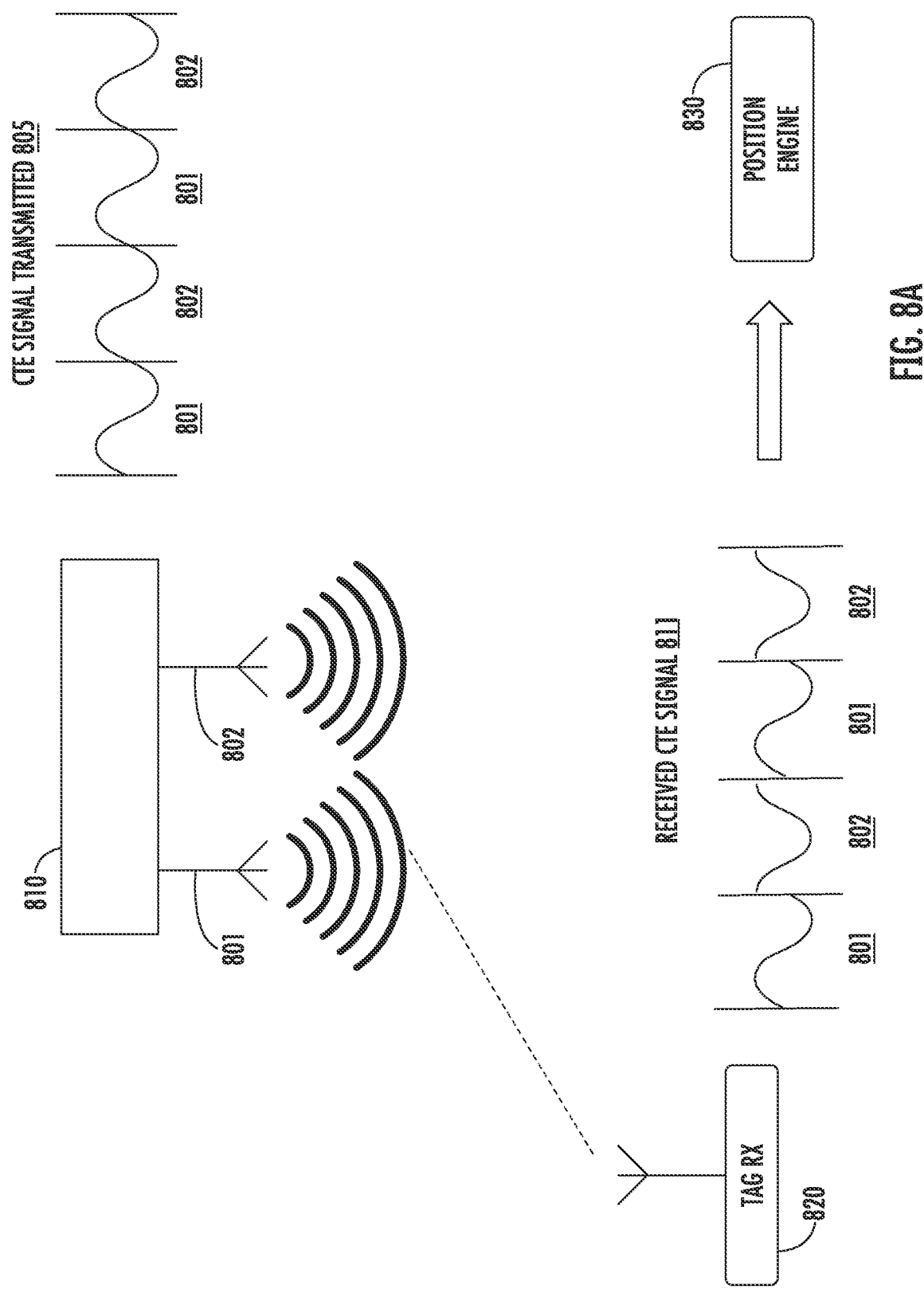
FIG. 8A shows a system for performing Angle of Departure operations according to one embodiment.

This technique is also applicable to Angle of Departure configurations. FIG. 8A shows a network device 810 having two antenna elements 801, 802. This network device 810 may have the components described with respect to FIGS. 1 and 2. FIG. 8A also shows a tag device 820. This tag device 820 may be similar to the tag device 500 described above and may have most of the components contained in the network device 810. However, unlike the tag device described above, the tag device 820 receives the CTE. FIG. 8A also shows a position engine 830. The position engine 830 is a device that is capable to calculating the angle of departure based on the data that was received by the tag device 820. The position engine may contain the similar components as the network device, as shown in FIG. 1 and FIG. 2. However, the position engine 830 may not contain an antenna array. Rather, the position engine 830 may have a single antenna element. Further, the computational power of the position engine 830 may be greater than that of a tag device, thereby enabling the position engine 830 to execute the necessary AoX algorithms, such as MUSIC. In certain embodiments, the position engine 830 may be contained within the network device 810. In other embodiments, the position engine 830 may be incorporated into another device or may be a standalone device. In other embodiments, the position engine 830 may be in the tag device 820 or disposed in the cloud.

The network device 810 transmits the CTE signal to a tag device 820 is located at an angle θ from the network device 810. The network device 810 transmits a CTE signal 805 having a continuous sine wave. The network device 810, in this embodiment, has two antenna elements. Thus, the network device 810 transmits the CTE signal on the first antenna element 801 and, during the switch slot 343, switches the antenna element and then transmits the CTE signal on the second antenna element 802. The network device 810 may switch between these two antenna elements a plurality of times.

Further, while FIG. 8A shows a network device 810 having two antenna elements, the disclosure is not limited to this embodiment. The network device 810 may include any number of antenna elements. In this embodiment, the network device 810 uses a simple antenna switching pattern to transmit the CTE signal 805. For example, the network device 810 may sequentially switch to the next antenna element. For example, if there were N antenna elements, the network device 810 may select each antenna element in order and then return to the first antenna element. Thus, the antenna switching pattern may be 1, 2, . . . N, 1, 2, . . . N, etc.

The tag device 820 receives this transmitted CTE signal. The received CTE signal 811 is also shown, where the phase discontinuity is due to the difference in transmission distance between the first antenna element 801 and the second antenna element 802. The antenna element that transmitted each portion of the received CTE signal 811 is shown below the CTE signal 811. As shown in CTE signal 811, the phase of the portion of the received CTE signal 811 transmitted by second antenna element 802 is delayed by about 90°. The tag device 820 may transmit the data indicative of the received CTE signal 811 to a position engine 830. The transmission of the data is application specific. In some embodiments, the IQ data may be transmitted to position engine 830 over a wireless network such as Bluetooth or Wi-Fi. The IQ data may also be stored to the memory in the tag device 820 and loaded to the position engine 830 later when tag device 820 has access to a wired network. In certain embodiments, the position engine 830 may be incorporated in the network device 810. In other embodiments, the position engine 830 may be a separate component or may be integrated into another device, including the tag device 820 or the cloud. The position engine 830 may then calculate the angle of departure based on this data which is indicative of the received CTE signal 811, using any known AoX algorithm, such as MUSIC.

Figure 8B:
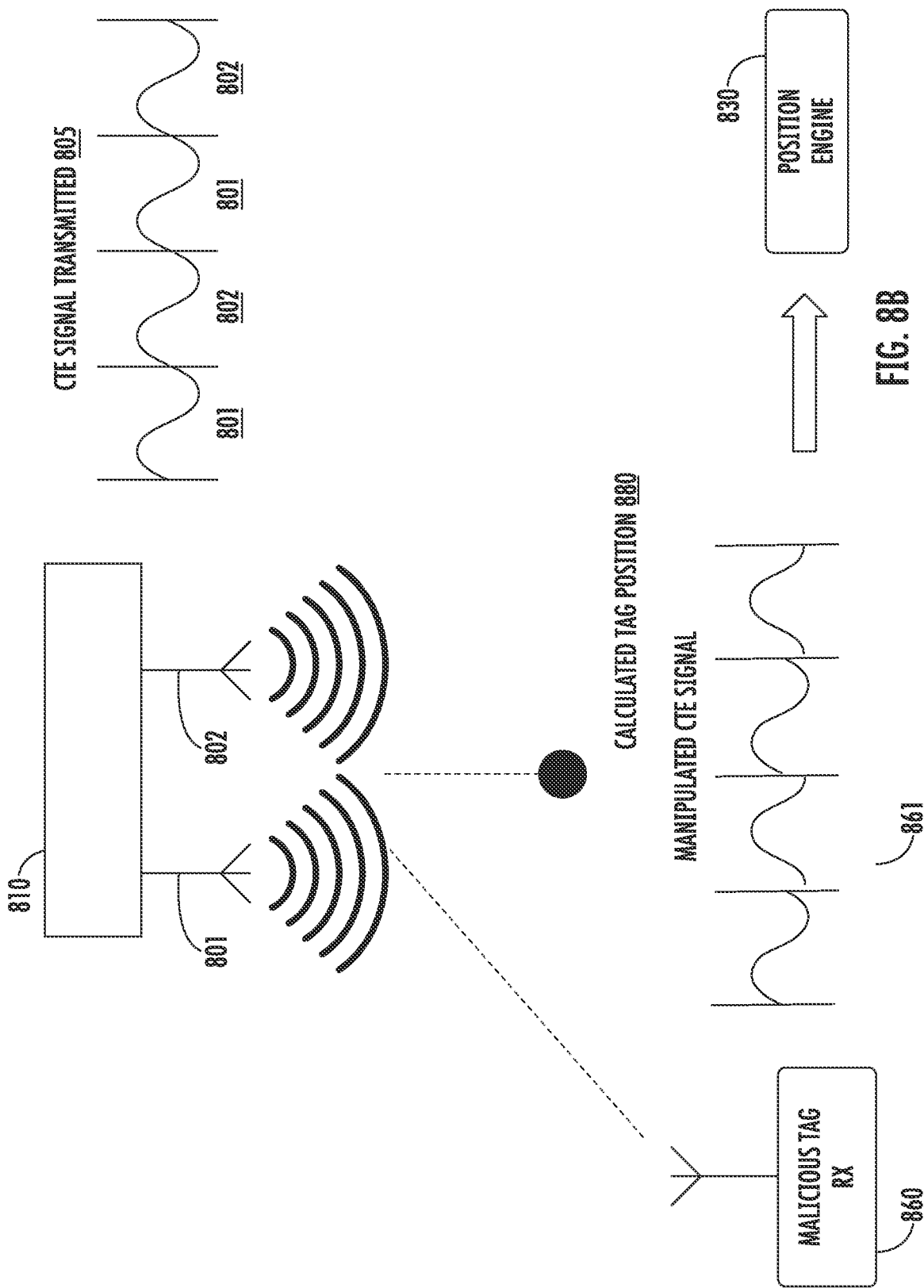
FIG. 8B shows the system of FIG. 8A wherein a malicious tag device has manipulated the CTE signal before transmitting it to the position engine.

In one embodiment, shown in FIG. 8B, a malicious tag device 860 may receive the CTE signal 805 from the network device 810, as described above. However, the malicious tag device 860 may transmit data indicative of a manipulated CTE signal 861 to the position engine 830. The position engine 830 would then calculate the angle of departure based on this manipulated CTE signal 861. This may result in incorrect location information for this malicious tag device. For example, the position engine 830 may compute a calculated tag position 880 that is different from the actual location of the tag device.

In another embodiment, an attacker tag device may be used to modify the CTE signal as it is transmitted from the network device 10 to the tag device. Thus, the tag device will receive a CTE signal that is different from that which was transmitted by the network device 810.

In both embodiments, the position engine 830 will receive data that is indicative of a manipulated CTE signal 861 from the tag device.

Figure 9:
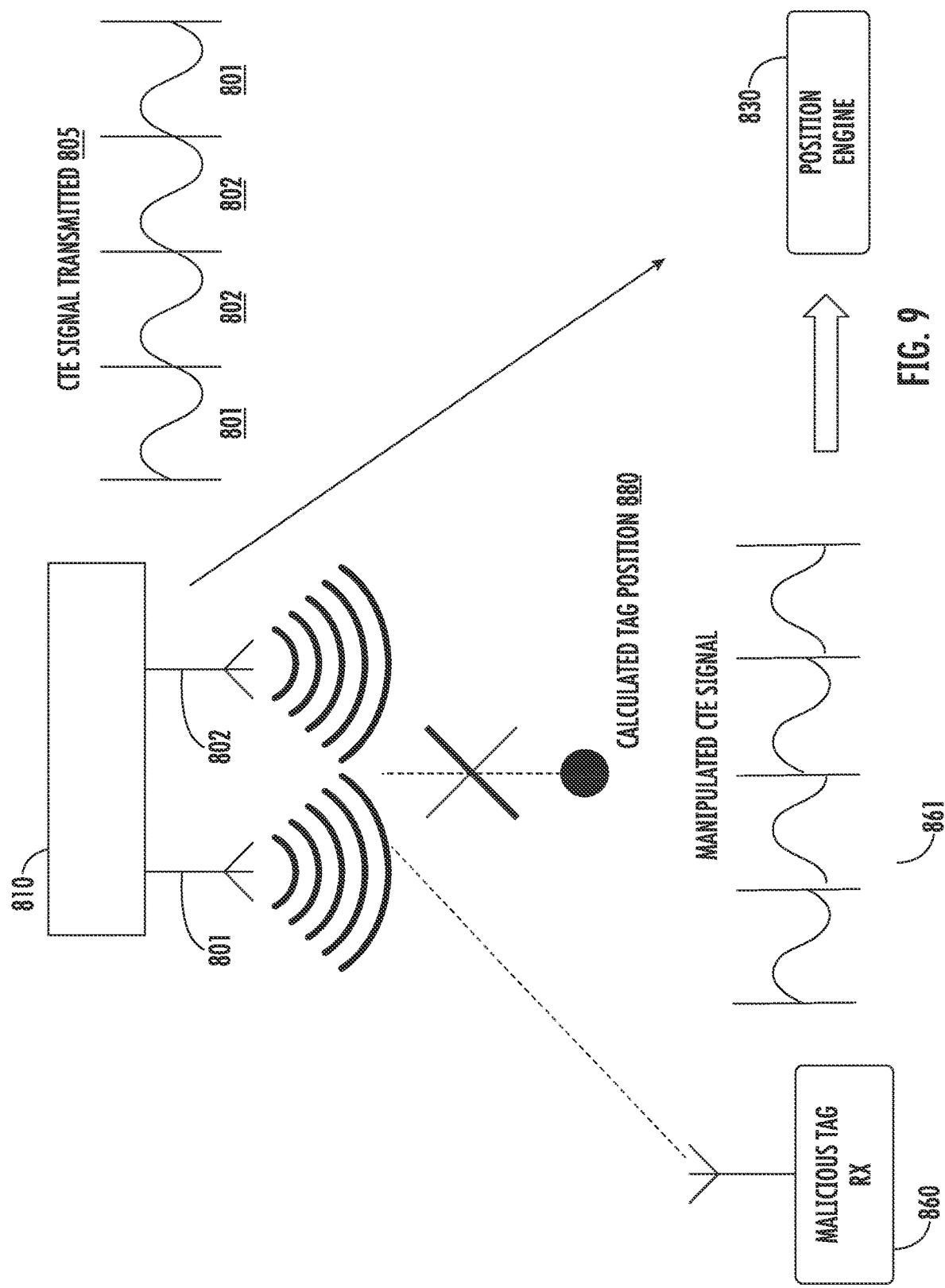
FIG. 9 shows the system of FIG. 8B wherein the position engine has detected that a malicious tag device has manipulated the CTE signal.

The mechanism described above can be used to detect this phase manipulation as well. FIG. 9 shows the system where the antenna switching pattern is changed by the network device 810. Further, if the position engine 830 is different from the network device 810, the network device 810 transmits this antenna switching pattern to the position engine 830. In other words, the position engine 830 receives the CTE signal from the tag device and the antenna switching pattern from the network device 810. The position engine can then compare the phase of two portions of the CTE signal that were received by the same antenna element in the manner described above.

Figure 10A:
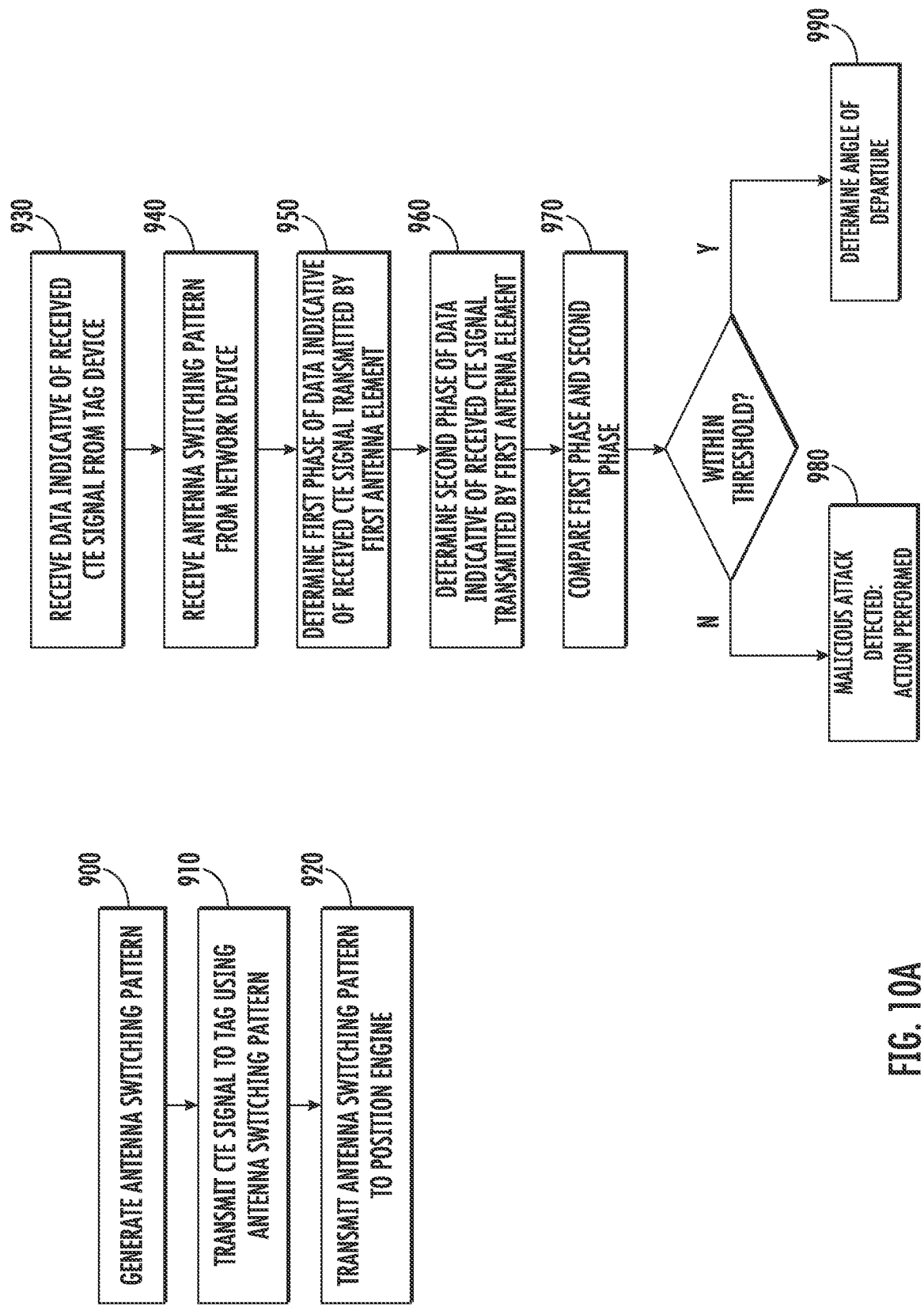
FIG. 10A shows a sequence of operations performed by the network device and the position engine during an AoD operation according to one embodiment.

FIG. 10A shows the actions of the network device 810 and the position engine 830 in this embodiment. The operations of the network device 810 is shown on the left side of FIG. 10.

First, as shown in Box 900, the network device 810 generates an antenna switching pattern. This antenna switching pattern may be randomized using a true random number generator or a CSPRNG algorithm. Alternatively, the antenna switching pattern may include the insertion of multiple sample slots that utilize the same antenna element, as described above. The network device 810 then transmits the CTE signal using this antenna switching pattern to a tag device, as shown in Box 910. Finally, as shown in Box 920, the network device 810 transmits the antenna switching pattern to the position engine 830, such as over the wireless network. This transmission may be encrypted. For example, a special predefined antenna switching security key may be used to encrypt the transmission of the antenna switching pattern. In certain embodiments, the order of these operations may be changed. For example, the network device 810 may transmit the antenna switching pattern to the position engine 830 prior to transmitting the CTE signal to the tag device. In embodiments where the position engine 830 is disposed within the network device 810, the operation shown in Box 920 may be an internal operation, which does not utilize the wireless network.

If the antenna switching pattern is generated by the network device 810 using a CSPRNG algorithm, it may be sufficient to initially provide the position engine 830 with the seed value and not have the network device 810 continue to provide the antenna switching pattern to the position engine 830. In this way, the position engine 830 may use the seed value and the same CSPRNG algorithm to generate the same antenna switching pattern independently.

The operations of the position engine 830 are shown on the right side of FIG. 10A.

The position engine 830 receives data indicative of the received CTE signal from the tag device 820, as shown in Box 930. This may be transmitted over the wireless network. The type of data that is transmitted may depend on certain parameters, such as the processing power of the tag device 820 and the available bandwidth. In certain embodiments, the data may be in raw IQ format. In other embodiments, the IQ data may be preprocessed by the tag device 820 prior to transmission. In certain embodiments, the data may be encrypted or signed such that the position engine 830 may verify the source of the received data.

Additionally, the position engine 830 receives the antenna switching pattern from the network device 810, as shown in Box 940. This transmission may be encrypted and transmitted over the wireless network. For example, a special predefined antenna switching security key may be used to encrypt the transmission of the antenna switching pattern. In certain embodiments, the order of these operations may be changed. For example, the network device 810 may transmit the antenna switching pattern to the position engine 830 prior to the position engine 830 receiving the received CTE signal from the tag device.

Once the position engine 830 has received the antenna switching pattern (or calculated the antenna switching pattern using a CSPRING algorithm) and the received CTE signal, it can determine whether a malicious attack has occurred. For example, as shown in Box 950, the position engine 830 may determine the phase of a first portion of the received CTE signal that was transmitted by the network device 810 using a first antenna element. The position engine may then identify a second portion of the received CTE signal that also utilized the first antenna element. The position engine 830 may then determine a phase of this second portion of the received CTE signal that was transmitted by the network device 810 using a first antenna element, as shown in Box 960.

Additionally, the position engine may determine the amplitudes of the first portion and the second portion.

The position engine 830 then compares this first phase and this second phase, as shown in Box 970. If the CTE of FIG. 3C is used, the position engine 830 simply compares the two phases. However, if the CTE of FIG. 3B is used, the position engine 830 must incorporate any phase difference that exists between even numbered and odd numbered sample slots into its calculations. For example, the position engine 830 may add 180° to all odd numbered sample slots and then perform the comparison described above.

If the difference between these phases is more than a threshold, the position engine 830 detects a malicious attack and performs some action, as shown in Box 980. This threshold may be predetermined or may be adaptive, such as based on a cumulative or moving average, as described above. This action may include discarding the location information associated with this tag device, alerting an operator, logging the incident or changing a radio parameter. Thus, in certain embodiments, the position engine 830 may provide information to the network device 810. If the difference between these phases is less than this threshold, the position engine 830 determines the angle of departure, as shown in Box 990.

Again, the position engine 830 may also use amplitude in addition to phase, to make this determination.

Further, if desired, the position engine 830 may also compare the phase of two portions of the received CTE signal that were transmitted from the network device 810 to the tag device using a second antenna element. If the difference between these phases is more than a predetermined threshold, the position engine 830 detects the malicious attack and performs the action shown in Box 980.

As was described above, the position engine may operate in second mode referred to as a protection mode, wherein the position engine 830 not explicitly detect a malicious phase attack, but implicitly detects such an attack.

For example, as shown in FIG. 10B, the network device 10 may generate an antenna switching pattern before an AoD operation is to be performed, as shown in Box 900. The network device 10 then transmits the CTE using this antenna switching pattern, as shown in Box 910. The network engine also forwards the antenna switching pattern to the position engine 830, as shown in Box 920.

The position engine 830 receives data indicative of the received CTE signal from the tag device 820, as shown in Box 930. Additionally, the position engine 830 receives the antenna switching pattern from the network device 810, as shown in Box 940. Alternatively, the position engine 830 determines the antenna switching pattern using a seed value and a SPRNG algorithm. The position engine 830 then attempts to calculate the angle of departure of the signal based on the received CTE signal, as shown in Box 941. This may be done using MUSIC or any other algorithm. If the results are indeterminate, the position engine 830 may detect that a malicious attack is underway. The position engine or network device may then perform some action, similar to the actions taken above, as shown in Box 980. If the result of the angle of arrival calculation are determinate, the position engine 830 may accept the location data, as shown in Box 981.

In both modes, the network device 810 generates an antenna switching pattern. The network device 810 then transmits the CTE signal using this antenna switching pattern. Further, in both modes, the position engine 830 may identify a malicious phase attack based on the phase information contained within the CTE signal. In the detection mode, the position engine 830 may compare the phase of two or more sample slots that were received using the same antenna element to detect a malicious attack. In the protection mode, the phase information is used as an input to the AoD algorithm. If the algorithm cannot resolve the AoD based on this phase information, the position engine 830 may detect a malicious phase attack. In both modes, a malicious phase attack is identified. In the event of a detected malicious phase attack, the position engine 830 or the network device 810 may take some action, such as discarding the location data, alerting an operator, logging the incident or changing radio parameters.

The angle of arrival or departure may be used for many functions. For example, one angle of arrival locator can be used to locate a beacon. This class of applications may be referred to as wayfinding. For example, the beacon may be a set of car keys or another device that a user needs to find. A user, holding the locator device, may be led to the beacon based on the angle of arrival detected by the locator device. As an example, an automobile may be equipped with Bluetooth. A command may be sent by the owner to the automobile disposed in a parking lot to transmit a beacon or sequence of beacons. The locator device, which is carried by the owner, detects the angle of arrival and can lead the owner toward the automobile in the parking lot. In another embodiments, a shopping mall may install beacons at certain locations, such as near exits, certain stores, or the food court. The shopper may use these beacons to guide their way through the mall using a portable locator device. Similarly, the angle of arrival can be used to guide an operator toward an asset in a warehouse or other structure. The locator device may include an indicator that allows the operator to determine the angle of arrival. For example, the locator device may have a visual display that indicates the direction of the beacon. Alternatively, the locator device may have an audio output that informs the user of the direction of the beacon.

When multiple locators are used, the exact location of the transmitter can be determined. This class of applications is referred to as spatial positioning. For example, inside a structure that has multiple locator devices, the exact location of any transmitter may be determined. This may serve to replace GPS in these environments, as GPS positioning requires more power to execute or for indoor locations where the GPS signal is weak or not available. In one example, an operator may carry a mobile telephone. A plurality of locator devices each determine the angle of arrival for a beacon transmitted by this phone. In one embodiment, these angles of arrival are forwarded to the mobile phone. In another embodiment, these angles of arrival are forwarded to a centralized computational device, which calculates the position of the mobile phone based on all of the received angles of arrival. Thus, the angle of arrival from each locator device may be used by the mobile phone or another device to pinpoint the specific location of the mobile phone. If a plurality of locator devices are employed, three dimensional spatial positioning may also be possible.

The present system and method have many advantages. This method increases the security of the system and makes it more difficult to counterfeit the location data, thereby making the system more trustworthy and less prone malicious attacks. This is especially important in systems where incorrect location may have severe implications. Additionally, discarding corrupted packets may improve the power consumption of the system and the accuracy of the location data.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A system to detect a malicious attack during an Angle of Departure operation, comprising:
   a network device, comprising:
      a wireless network interface, wherein the wireless network interface comprises an antenna array having a plurality of antenna elements and an analog multiplexer, wherein the wireless network interface transmits a signal from an antenna element of the antenna array;
   a processing unit; and
   a memory device, comprising instructions, which when executed by the processing unit, enable the network device to:
      generate an antenna switching pattern;
      transmit a packet that includes a constant tone extension (CTE) to a tag device, wherein the CTE comprises a tone having a known frequency and wherein the CTE comprises a plurality of switch slots and a plurality of sample slots, wherein the antenna element used to transmit the CTE during each sample slot is determined from the antenna switching pattern; and
      transmit the antenna switching pattern to a position engine; and the position engine, comprising:
  a wireless network interface, wherein the wireless network interface comprises an antenna;
  a processing unit; and
  a memory device, comprising instructions, which when executed by the processing unit, enable the position engine to:
  receive the antenna switching pattern from the network device;
  receive data indicative of a received CTE signal from the tag device; and
  based on phase information obtained from the data indicative of the received CTE signal, perform an action if a malicious phase attack is detected.

2. The system of claim 1, wherein the action is selected from the group consisting of:
  discarding location information for the tag device;
  alerting an operator;
  logging an incident; and
  changing a radio parameter.

3. The system of claim 1, wherein the antenna switching pattern is randomly generated.

4. The system of claim 1, wherein the instructions enable the position engine to:
  attempt to determine an angle of departure based on the phase information from the data indicative of the received CTE using an AoD algorithm; and
  if the AoD algorithm cannot identify the angle of departure, detect a malicious phase attack and perform the action in response to a detection of the malicious attack.

5. The system of claim 1, wherein the instructions enable the position engine to:
  compare a phase of two portions of the data indicative of the received CTE signals that were transmitted by the network device using a first antenna element; and
  if a difference between phases of the two portions of data indicative of the received CTE signal transmitted using the first antenna element is greater than a threshold, perform the action in response to a detection of the malicious attack.

6. The system of claim 5, wherein the instructions enable the position engine to:
  compare the phase of two portions of the received CTE signal that were transmitted by the network device using a second antenna element; and
  if the difference between the phases of the two portions of the received CTE signal transmitted using the second antenna element is greater than the threshold, perform the action in response to the detection of a malicious attack.

7. The system of claim 5, wherein the instructions enable the position engine to:
  calculate an angle of departure for the tag device if the difference is less than the threshold.

8. A method of detecting a malicious attack during an Angle of Departure operation, comprising:
  using a network device having a wireless network interface, wherein the wireless network interface comprises an antenna array having a plurality of antenna elements and an analog multiplexer, to generate an antenna switching pattern;
  using the network device to transmit a packet to a tag device that includes a constant tone extension (CTE), wherein the CTE comprises a tone having a known frequency and wherein the CTE comprises a plurality of switch slots and a plurality of sample slots, wherein the antenna element used to transmit the CTE during each sample slot is determined from the antenna switching pattern;
  transmitting the antenna switching pattern from the network device to a position engine;
  receiving, at the position engine, data indicative of the CTE signal received by the tag device; and
  performing an action, based on phase information obtained from the data indicative of the received CTE, in response to a detected malicious attack.

9. The method of claim 8, wherein the action is selected from the group consisting of:
  discarding location information for the tag device;
  alerting an operator;
  logging an incident; and
  changing a radio parameter.

10. The method of claim 8, wherein the antenna switching pattern is randomly generated.

11. The method of claim 8, wherein the position engine detects a malicious attack by:
  attempting to determine an angle of departure based on phase information from the data indicative of the received CTE using an AoD algorithm; and
  if the AoD algorithm cannot identify the angle of departure, detecting the malicious phase attack.

12. The method of claim 8, wherein the position engine detects a malicious attack by:
  comparing the phase of two portions of the data indicative of the received CTE signal that were transmitted by the network device using a first antenna element; and
  if a difference between phases of the two portions of the data indicative of the received CTE signal is greater than a threshold, detecting the malicious attack.

13. The method of claim 12, wherein the position engine detects a malicious attack by:
  comparing the phase of two portions of the data indicative of the received CTE signal that were transmitted by the network device using a second antenna element; and
  if the difference between the phases of the two portions of the received CTE signal transmitted by the second antenna element is greater than the threshold, detecting the malicious attack.

14. The method of claim 12, wherein position engine calculates an angle of departure for the tag device if the difference is less than the threshold.

15. A software program, comprising a first portion and a second portion, disposed on a non-transitory storage media, comprising instructions, wherein,
  when the first portion is executed by a processing unit disposed on a network device comprising a wireless network interface, wherein the wireless network interface comprises an antenna array having a plurality of antenna elements, enables the network device to:
  generate an antenna switching pattern;
  transmit a packet that includes a constant tone extension (CTE) to a tag device, wherein the CTE comprises a tone having a known frequency and wherein the CTE comprises a plurality of switch slots and a plurality of sample slots, wherein the antenna element used to transmit the CTE during each sample slot is determined from the antenna switching pattern; and
  transmit the antenna switching pattern to a position engine; and
    wherein, when the second portion is executed by a processing unit disposed on the position engine comprising a wireless network interface, enables the position engine to:

receive the antenna switching pattern from the network device;

receive data indicative of a received CTE signal from the tag device;

perform an action, based on phase information obtained from the data indicative of the received CTE, in response to a detected malicious attack.

16. The software program of claim 15, wherein the action is selected from the group consisting of:

discarding location information for the tag device;

alerting an operator;

logging an incident; and changing a radio parameter.

17. The software program of claim 15, wherein the antenna switching pattern is randomly generated.

18. The software program of claim 15, wherein the second portion comprises instructions, which, when executed by the processing unit disposed on the position engine, enable the position engine to detect a malicious attack by:

attempting to determine an angle of departure based on the phase information from the data indicative of the received CTE using an AoD algorithm; and if the AoD algorithm cannot identify the angle of departure, detecting the malicious attack.

19. The software program of claim 15, wherein the second portion comprises instructions, which, when executed by the processing unit disposed on the position engine, enable the position engine to detect a malicious attack by:

comparing the phase of two portions of the data indicative of the received CTE signal that were transmitted by the network device using the first antenna element; and if a difference between phases of the two portions of the received CTE signal is greater than a threshold, detecting the malicious attack.

20. The software program of claim 19, wherein the second portion comprises instructions, which, when executed by the processing unit disposed on the position engine, enable the position engine to:

compare the phase of two portions of the received CTE signal that were transmitted by the network device using a second antenna element; and if the difference between phases of the two portions of the received CTE signal is greater than the threshold, perform the action in response to a detection of a malicious attack.

21. The software program of claim 19, wherein the second portion comprises instructions, which, when executed by the processing unit disposed on the position engine, enable the position engine to:

calculate an angle of departure for the tag device if the difference is less than the threshold.

\* \* \* \* \*